United States Patent
Iizuka et al.

[11] Patent Number: 5,964,581
[45] Date of Patent: *Oct. 12, 1999

[54] REFRIGERANT COMPRESSOR

[75] Inventors: Tadashi Iizuka, Ashikaga; Reishi Naka; Katsumi Fukuda, both of Tochigi-ken; Makoto Tanaka, Kanuma; Yoshiharu Homma, Hitachi; Hiroaki Hata, Tochigi-ken; Hirokatsu Kousokabe, Ibaraki-ken; Koji Nariyoshi, Tochigi-ken; Hiroshi Iwata, Odawara, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/610,186

[22] Filed: Mar. 4, 1996

Related U.S. Application Data

[62] Division of application No. 08/309,601, Sep. 20, 1994, Pat. No. 5,711,165, which is a continuation of application No. 07/793,119, Nov. 18, 1991, abandoned.

[30] Foreign Application Priority Data

Nov. 16, 1990 [JP] Japan .................................. 2-308736

[51] Int. Cl.$^6$ .................................. C09K 5/04; F25B 1/04
[52] U.S. Cl. ................................... 417/410.3; 252/68
[58] Field of Search ....................... 252/68; 508/485, 508/492, 493; 418/83, 97, 94, 98, 178, 99; 417/902, 410.3

[56] References Cited

U.S. PATENT DOCUMENTS

| | | |
|---|---|---|
| Re. 19,265 | 8/1934 | Midgley et al. |
| 2,807,155 | 9/1957 | Williamitis . |
| 2,852,470 | 9/1958 | Henne et al. |
| 3,003,684 | 10/1961 | Tarleton . |
| 4,053,491 | 10/1977 | Koch et al. . |
| 4,234,497 | 11/1980 | Honig . |
| 4,788,833 | 12/1988 | Steele . |
| 4,851,144 | 7/1989 | McGraw et al. ................. 252/68 |
| 4,975,212 | 12/1990 | Thomas et al. ................. 252/68 |

FOREIGN PATENT DOCUMENTS

| | | |
|---|---|---|
| 0120606 | 10/1984 | European Pat. Off. . |
| 120606 | 10/1984 | European Pat. Off. . |

(List continued on next page.)

OTHER PUBLICATIONS

Development of Molecular Sieves for Flon R–134A Used in Automotive Air Conditioners; Mar. 2, 1989; Union Showa Co., LTD.

(List continued on next page.)

*Primary Examiner*—Alan Diamond
*Attorney, Agent, or Firm*—Antonelli, Terry, Stout & Kraus, LLP

[57] ABSTRACT

A refrigerant compressor using a refrigerant composed mainly of a fluorocarbon and/or hydrofluorocarbon type refrigerant containing no chlorine and having a critical temperature of 40° C. or higher, and a refrigerating machine oil comprising as base oil an ester oil of one or more fatty acids which contains at least two ester linkages

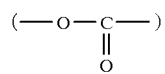

in the molecule and has a viscosity at 40° C. of 2 to 70 cSt and a viscosity at 100° C. of 1 to 9 cSt. The winding wire of the stator of the compressor has a core wire having an enamel coating having a glass transition temperature of 120° C. or higher.

31 Claims, 8 Drawing Sheets

FOREIGN PATENT DOCUMENTS

| | | |
|---|---|---|
| 171823 | 2/1986 | European Pat. Off. . |
| 0406479 | 1/1991 | European Pat. Off. . |
| 0415778 | 3/1991 | European Pat. Off. . |
| 0430657 | 6/1991 | European Pat. Off. . |
| 0435253 | 7/1991 | European Pat. Off. . |
| 435253 | 7/1991 | European Pat. Off. . |
| 0445611 | 9/1991 | European Pat. Off. . |
| 0448402 | 9/1991 | European Pat. Off. . |
| 0449406 | 10/1991 | European Pat. Off. . |
| 0458584 | 11/1991 | European Pat. Off. . |
| 0470788 | 2/1992 | European Pat. Off. . |
| 0475751 | 3/1992 | European Pat. Off. . |
| 54-108007 | 8/1979 | Japan . |
| 55-79642 | 6/1980 | Japan . |
| 55-154968 | 11/1980 | Japan . |
| 56-131548 | 10/1981 | Japan . |
| 56-133241 | 10/1981 | Japan . |
| 56-141545 | 11/1981 | Japan . |
| 59-117447 | 7/1984 | Japan . |
| 61-062596 | 3/1986 | Japan . |
| 62-000592 | 1/1987 | Japan . |
| 62-191692 | 8/1987 | Japan . |
| 2-196174 | 8/1990 | Japan . |
| 2-276894 | 11/1990 | Japan . |
| 208868 | 4/1969 | Russian Federation . |
| WO 90/12849 | 11/1990 | WIPO . |
| WO90/12849 | 11/1990 | WIPO . |

OTHER PUBLICATIONS

About XH–7 and SH–9; Nov. 1, 1989; Union Showa Co., LTD.

Certificate; Apr. 28, 1994; Union Showa Co., LTD.

Manual for Suitable Use of Special Flons; Japan Flon Gas Society (Date Unknown).

Molecular Sieves Suitable for R22, R134a, Etc.; May 18, 1989, Union Showa Co., LTD.

"Hermetic LBP Refrigerating Systems for R134A" Brochure of Danfoss, Sep., 1990.

"Possible Compressor Problems in Handling HFC–134A Car Air Conditioning Systems" Brochure of Passenger Car Meeting and Exposition Dated Sep. 16–19, 1991.

"Molecular Sieves Suitable for R22, 134A, Etc." Union Showa Co., LTD., May 18, 1989 and Certificate.

New Ed. 4th Print Reito Kucho Binran Basic Edition, May 30, 1981.

Conference Report Consideration on the Amount of CFCs to be Imported, Mar. 21, 1995; Mavijak, et al.

Establishing a Compressor Programme for R 134A (Danfoss); Apr., 1990; pp. 1–10.

Properties and Requirements Heavy Modified Polyester Overcoated with Polyamide–Imide Round Copper Magnet Wire for Hermetic Motor Applications; Oct., 1981; pp. 233–234.

Preprints of the 1990 USNC/IIR—Purdue Refrigeration Conference and the 1990 Ashrae—Purdue CFC Conference; Jul. 17–20, 1990; D. Tree; pp. 297–305.

Hermetic Motor Parts (Rolorex); Apr. 4, 1986; Sheets 1–13.

Synthetic Ester Lubricants (J. American Soc. Lubrication Engineers, pp. 454–458; Asle–Asme 4th Lubrication Conference; Oct. 7–9, 1983; R. S. Barnes et al.

Specification: Polyesterimide–Amide Copper Wire (Taihan Electric Wire Co., LTD.); Jul. 3, 1990; pp. 1–9.

Technical Report of "Lumirror" X10 (Toray); Aug. 20, 1990; (Confidential); pp. 1–22.

Kogyo Zairyo, vol. 36, No. 2, pp. 90–91, 50–51; Jan., 1988 (With Partial English Translation).

Recent Development on Magnet Wire for Hermetic Motor Use (Furukawa Denko Jiho, vol. 51, pp. 45–65; Apr., 1972).

Tendency of Regulation on Freons, Etc. (Toray Industries, Inc.); Jan. 23, 1989 (Secret Document Outside the Company); pp. 1–16.

Use Examples of Ester Type Synthetic Lubricants (Nihon Reito Kuhcho Shi, Dec., 1987); pp. 17–19 (With Partial English Translation).

Closed Type Refrigerators (Author: Mutsuyoshi Kawahira) pp. 1–2, 108–117; Jun. 30, 1981: (With Partial English Translation).

A Review of Synthetic Oils for Refrigeration Use; K. Sanvordenker, et al; pp. 14–19; 1972 (Month Unknown).

Fatty Acid Chemistry, pp. 365–375, 1981 (With Partial English Translation) (Month Unknown).

Fourth Symposium on Refrigeration/Air–Conditioning and Refrigerating Machine Oils (With Partial English Translation); Nov. 14, 1989; pp. 6–1 to 6–8.

J. Japan. Soc. of Tribologists, vol. 35, No. 9, pp. 621–626; Sep. 15, 1990 (With Partial English Translation).

Koude & Klimaat 82. (Dec., 1989) NR 12; Droogmiddelen Voor R134A Koelsstemen; S. L. Correll (With English Summary) pp. 16–19.

Materials Compatibility of R134A in Refrigerant Systems; Jan., 1989; CFCs: Time of Transition; American Society of Heating, Refrigerating and Air–Conditioning Engineers, Inc.; pp. 211–216.

Thermodynamic Properties of a New Stratospherically Safe Working Fluid—Refrigerant 134; 1989; (month unknown) CFCs: Time of Transition; American Society of Heating, Refrigerating and Air–Conditioning . . . ; pp. 104 & 115.

Database WPI Section Ch, Week 8106, Derwent Publs. (Nippon Oils) Dec. 4, 1980, Abstract #81–08816D.

Droogmiddelen voor R134a Koelsystemen, S.S. Correll, 12–1989.

Database WPI Section Ch, Week 8805 Derwent Publs. (Nippon Oils) Dec. 19, 1987 Abstract #88–033105.

REFRIGERANT COMPRESSOR

This is a division of application Ser. No. 08/309,601, filed Sep. 20, 1994, now U.S. Pat. No. 5,711,165, which is a continuation of application Ser. No. 07/793,119, filed Nov. 18, 1991, now abandoned.

BACKGROUND OF THE INVENTION

1. Field of the Invention

The present invention relates to a refrigeration cycle and refrigerant compressor, and it relates to, in particular, a refrigeration-cycle-constituting material system comprising a refrigerating machine oil composition suitable for a flon type refrigerant containing no chlorine and having a critical temperature of 40° C. or higher, for example, flon 134a, and electrical insulating materials and a drying agent which are hardly deteriorated by the refrigerating machine oil composition.

2. Prior Art

In recent years, chlorine-containing flons (chlorofluorocarbons, abbreviated as CFC) have been included in the list of compounds under regulation in use, all over the world because of the problems of environmental pollution, in particular, the ozone depletion and the global warming.

All of flons included in the list of compounds under regulation in use are chlorine-containing flons such as flon 11, flon 12, flon 113, flon 114, flon 115, etc. Flon 12 which has been exclusively used as a refrigerant in refrigerating apparatus such as refrigerators, dehumidifiers, etc., has also been included in the list.

Therefore, a refrigerant usable in place of flon 12 is required. Hydrofluorocarbon (HFC) having a low reactivity with ozone and a short decomposition period in the air has recently been noted as a substitute refrigerant. Flon 134a (1,1,1-tetrafluoroethane, $CH_2FCF_3$) is a typical example of such a refrigerant. In detail, when the ozone depletion potential (ODP) of flon 12 (dichlorodifluoromethane $CCl_2F_2$) is taken as 1, that of flon 134a is zero. When the global warming potential (GWP) of flon 12 is taken as 1, that of flon 134a is 0.3 or less. Flon 134a is noncombustible and similar to flon 12 in thermal properties such as temperature-pressure characteristics. Therefore, flon 134a has been said to be advantageous in that it can be put into practical use without greatly changing the structures of refrigerating apparatus such as refrigerators and dehumidifiers and refrigerant compressors in which flon 12 has heretofore been used.

Flon 134a, however, has a unique chemical structure and hence very characteristic properties. Therefore, it has a very poor compatibility with refrigerating machine oils such as mineral oils and alkylbenzene oils which have been used in conventional refrigeration system using flon 12, and hence it cannot be put into practical use at all. In addition, the suitability including the improving effect on the lubrication and the resistance to frictional wear of the sliding portions of compression mechanical parts, the influence on electrical insulating materials, the influence on drying agents, etc. is a problem, and there has been an eager desire for the development of a novel material system constituting a compressor and a refrigerating apparatus.

Therefore, before referring to the problem of the miscibility of a refrigerant with a refrigerating machine oil, conventional refrigerant compressor and refrigeration apparatus which use a flon type refrigerant are first explained with reference to FIG. 7 to FIG. 9.

FIG. 7 is a vertical cross-sectional view of the principal part of a conventional closed rotary compressor. FIG. 8 is a cross-sectional view for explaining the displacement volume of the compressor section of the compressor. FIG. 9 is a diagram showing the structure of an ordinary refrigeration cycle.

In FIG. 7, numeral 1 shows a case (chamber) used both as a closed container and as a oil pan. In the case 1, an electric motor section 22 and a compressor section 23 are accommodated.

The electric motor 22 is composed of a stator 19 and a rotor 20, and a rotating shaft 4A made of cast iron is fitted in the rotor 20. The rotating shaft 4A has an eccentric portion 3 and an shaft hole 17 is formed in hollow form on the one side of the eccentric portion 3.

The core wire of the winding wire portion 19a of the stator 19 is coated with an ester imide film, and an electrical insulating film of a polyethylene terephthalate is inserted between the core portion and the winding wire portion of the stator. The rotating shaft 4A has a surface finished by grinding.

The compressor 23 has as its chief mechanism components a cylinder 2 made of an iron-based sintered product; a roller 7 made of cast iron which is fitted in the eccentric portion 3 of the rotating shaft 4A and eccentrically rotated along the inside of the cylinder 2; a high-speed steel vane which is reciprocated in the groove 8 of the cylinder 2 while one side of the vane is in contact with the roller 7 and the other side is pushed by a spring 9; and a main bearing 5 and a sub-bearing 6 which are made of cast iron or an iron-based sintered product, are provided on both ends of the cylinder, and serve both as bearings for the rotating shaft 4A and as the side wall of the cylinder 2.

The sub-bearing 6 has a discharge valve 27, and a discharge cover 25 is attached thereto so as to form a silencer 28. The main bearing 5, the cylinder 2 and the sub-bearing 6 are fastened with a bolt 21.

A pump chamber 12 is composed of a space and parts surrounding the space, i.e., the back of the vane 10, the groove 8 of the cylinder 2, the main bearing 5 and the sub-bearing 6.

The main bearing 5 has a suction piece 14 which can suck a naphthene type or alkylbenzene type refrigerating machine oil 13A in which a refrigerant flon gas stored in the bottom of the case 1 has been dissolved, into the pump chamber 12. The sub-bearing 6 has a discharge port 16 which can discharge the refrigerating machine oil 13A to an oil tube 15 from the pump chamber 12. The oil tube 15 is designed to be able to supply the refrigerating machine oil 13A to the shaft hole 17 of the rotating shaft 4A and then to predetermined sliding portions from the shaft hole 17 through a branch opening 18.

The action of the rotary compressor thus composed is explained below with reference to FIGS. 7 and 8. When the compressor is operated to rotate the rotating shaft 4A made of cast iron, a roller 7 made of tempered cast iron is rotated with the rotation of rotating shaft 4A, and the high-speed steel vane 10 is reciprocated in the groove 8 of the cylinder 2 made of cast iron or a iron-based sintered product while the vane 10 is pushed by the spring 9 and its end is in contact with the roller 7. Thus, the vane 10 compresses a refrigerant (flon 12) which has flown in through a refrigerant suction opening (not shown), and the refrigerant is discharged outside the compressor from a discharge pipe 29 through a refrigerant discharge opening 24. The winding wire portion 19a and the electrical insulating film (not shown) of the stator 9 are immersed in the refrigerating machine oil containing flon dissolved therein, or they are exposed to circumstances of spraying with mist of the refrigerant oil.

In the case of a combination of a conventional refrigerating machine oil consisting of a mineral oil or an alkylbenzene and flon 12, flon 12 is completely miscible with the refrigerating machine oil in all use ranges, so that it has been not necessary at all to care about the various problems concerning the miscibility of flon 134a with a refrigerating machine oil which are hereinafter described in detail, namely, the separation into two layers between the refrigerating machine oil and the refrigerant in a compressor, and the residence of the refrigerating machine oil in a heat exchanger. However, in the case of fluorohydrocarbon type refrigerants containing no chlorine which have unique characteristics, for example, flon 134a, the miscibility of the refrigerant with a refrigerating machine oil is the most serious problem in practice because there is no practical refrigerating machine oil which can easily dissolve the refrigerant.

In general, for improving the performance characteristics of a compressor, namely, the coefficient of performance (COP) which indicates the energy efficiency, it has been necessary to minimize the mechanical loss of the compressor and maximize its volumetric efficiency.

The mechanical loss of a refrigerant compressor mainly includes the friction loss at the journal bearing and thrust bearing in the mechanical part and the power for agitating oil. In general, it has been said that the best means is to minimize the value of the coefficient of friction ($\mu$) defined by the following equation on the basis of the hydrodynamic lubrication theory of a journal bearing:

$$\mu = 2\pi^2 (D/C) \eta N/P \qquad (9)$$

wherein

N: revolution rate,

P: pressure on surface, $\eta$: viscosity,

D: diameter of shaft,

C: diametral clearance.

This fact indicates that in a refrigerant compressor operated under hydrodynamic lubrication conditions, not only the structural factors regarding dimensions and shapes but also the actual viscosity of a refrigerating machine oil containing flon disolved therein which is a factor influenced by operation circumstances, have a close relationship to the mechanical loss of the compressure.

On the other hand, for keeping the volumetric efficiency highest, it is necessary that in a mechanical chamber for compressing a refrigerant gas, the leakage of the refrigerant gas from the high pressure side to the low pressure side should be prevented by carrying out sealing between parts which works to compress the refrigerant gas. It should be noted that also in this case, the actual viscosity of a refrigerating machine oil containing the refrigerant dissolved therein has an important function.

As described above, in a refrigerant compressor heretofore used by the use of flon 12 and a refrigerating apparatus using the refrigerant compressor, it is important for the improvement of performance characteristics of the compressor to optimize the actual viscosity of a refrigerating machine oil containing the refrigerant dissolved therein, at a rated operation point under usual operation conditions.

A refrigerating apparatus such as a refrigerator or a dehumidifier is operated, though in rare cases, in a high-temperature circumstance much more severe than usual operation conditions. In this case, the lubrication in the apparatus gets into a so-called boundary lubrication region in which a lubricating oil layer is thined, so that the metal surfaces of sliding portions of a bearing are brought into contact with each other. Consequently, the coefficient of friction is increased at once, resulting in heat generation. herefore, scoring or seizing-and-adhesion phenomenon occurs between the bearing and a rotating shaft and deteriorates the reliability of a refrigerant compressor. Therefore, some consideration is needed for preventing a fatal problem from occuring even under boundary lubrication conditions. In a conventional refrigerant compressor using flon 12, chlorine in flon 12 acts effectively as an extreme pressure agent. In detail, when scoring or seizing-and-adhesion phenomenon takes place between a bearing and a rotating shaft, the refrigerant flon 12 dissolved in a refrigerating machine oil as bearing-lubricating oil is decomposed by frictional heat generated by the scoring or the phenomenon, and chlorine, i.e., the decomposition product, reacts with iron on the surface of the bearing to form iron chloride which acts as a lubricant.

As described above, in the case of a refrigerating apparatus using a high-pressure vessel type rotary compressor, for example, a refrigerator, a refrigerant compressor and a refrigerating apparatus which satisfy the operation conditions at an ambient temperature of 30° C. described below are satisfactory in the coefficient of performance indicating energy efficiency and the reliability of a product, and most products have been used in such ranges. The discharge pressure of the compressor: about 10 kg/cm²abs, oil temperature; about 100° C., refrigerating machine oil: an alkylbenzene oil or a mineral oil having a viscosity at 40° C. of 56 cSt and a viscosity at 100° C. of 6 cSt, the actual viscosity of which becomes 1 to 4 cSt.

On the other hand, in the case of a refrigerating apparatus using a low-pressure vessel type reciprocating compressor (the explanation of the structure and operation is omitted), for example, a refrigerator, there have been used a refrigerant compressor and a refrigerating apparatus which satisfy the following operation conditions at an ambient temperature of 30° C.; the suction pressure of the compressor: about 1.6 kg/cm² abs, oil temperature: 85° C., refrigerating machine oil: a mineral oil having a viscosity at 40° C. of 8 to 15 cSt and a viscosity at 100° C. of 1.8 to 4.2 cSt, the actual viscosity of which becomes 2 to 6 cSt.

Next, a fundamental refrigeration cycle provided with a refrigerant compressor which thus sucks, compresses and then discharge a flon type refrigerant, is explained below with reference to FIG. 9.

As shown in FIG. 9, a compressor 40 compresses a low-temperature, low-pressure refrigerant gas, discharges the resulting high-temperature, high-pressure refrigerant gas and send the same to a condenser 41. The refrigerant gas sent to the condenser 41 becomes a high-temperature, high-pressure refrigerant fluid while releasing its heat to the air, and then it is sent to an expansion mechanism (e.g. an expansion valve or a capillary tube) 42 while being freed from water by a dryer 45. The high-temperature, high-pressure refrigerant fluid which passes the expansion mechanism becomes low-temperature, low-pressure wet vapor owing to squeezing effect and is sent to an evaporator 43. The refrigerant introduced into the evaporator 43 is evaporated while absorbing heat from the surroundings, and the low-temperature, low-pressure gas which has come out of the evaporator 43 is sucked into the condenser 40. Thereafter, the above cycle is repeated.

As there frigerant, flon 12 has heretofore been used. However, the employment of flon 12 is under regulations, as described above. The employment of flon 134a in place of flon 12 involves many problems because conventional mineral oil type or alkylbenzene type refrigerating machine oils for flon 12 are very poor in miscibility with flon 134a. Therefore, refrigerating machine oils having a good miscibility with flon 134a have been vigorously developed and various refrigerating machine oils have been proposed. As typical examples of such refrigerating machine oils, there are known the compounds having ether linkages exemplified below.

For example, Japanese Patent Application Kokai No. 1-259093 discloses "a refrigerating machine oil for a flon compressor" which comprises as base oil a propylene glycol monoether represented by the general formula:

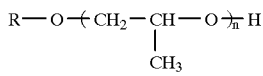

wherein R is an alkyl group having 1 to 8 carbon atoms, and n is an integer of 4 to 19; Japanese Patent Application Kokai No. 1-259094 discloses a diether type compound obtained by etherifying one end of propylene glycol which is represented by the general formula:

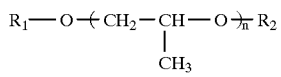

wherein each of $R_1$ an $R_2$ is an alkyl group having 1 to 8 carbon atoms, and n is an integer (average molecular weight: 300 to 600); and Japanese Patent Application Kokai No. 1-259095 discloses a monoether type compound which is a copolymer of propylene glycol and ethylene glycol and is represented by the general formula:

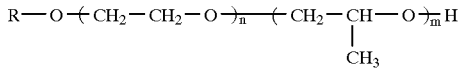

wherein R is an alkyl group having 1 to 14 carbon atoms, and m and n are integers, the ratio m:n being 6:4 to 1:9 (average molecular weight: 300 to 2,000).

The difference of these polyalkylene glycols from conventional mineral oils and alkylbenzene oils have been reported as follows. By the introduction of ether linkages into the molecule, the affinity for flon 134a is enhanced to improve the miscibility with flon 134a greatly, refrigerant lubrication due to the phenomenon of separation into two layers (a phenomenon that the refrigerant and the refrigerating machine oil are insoluble in each other and separate; hereinafter referred to merely as "two-layer separation") in the sliding portions of a compressor can be prevented, the return of the oil to the compressor which is induced by residence phenomenon due to the adhesion of the oil to the inner wall of a heat exchanger can be suppressed, and there can be solved the problems concerning the reliability of the compressor and a refrigerating apparatus, for example, seizing and scoring in the sliding portions of the compressor.

Such compounds thus containing a large number of ether linkages (C—O—C), however, are disadvantageous in that, (1) they have a saturation water absorption rate is high (they tend to absorb water).

(2) they have a low volume resistivity.

(3) they have a low oxidation stability, so that the total acid value is apt to be increased. Therefore, the compounds have been not suitable for refrigerant compressors and refrigerating apparatus in which a hermetic motor is used as an electric motor. That is, although the compounds have an improved miscibility with the refrigerant, they are disadvantageous in that they attack the insulating materials of the motor to deteriorate the electrical insulating characteristics. In all of the above compounds, the end group having an ether linkage is capped with hydrogen, and the hydrogen further increases the hygroscopicity. Therefore, it has been proposed to replace the hydrogen by an ester group to obtain a refrigerating machine oil represented by the following formula (see Japanese Patent Application Kokai No. 2-132178):

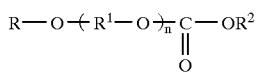

wherein R is a hydrocarbon group, $R^1$ is an alkylene $R^2$ is an alkyl group, and n is an integer which is such that the viscosity of this compound becomes 10 to 300 (at 40° C.).

However, the improved miscibility with the refrigerant of this compound is also brought about by a large number of ether linkages in the molecule, like that of the above compounds, and hence this compound involves the same problems as in the case of the above compounds.

Thus, the compounds having ether linkages tend to absorb water because of the above problem (1), and the compounds themselves are hydrolyzed by the water to become unstable. Furthermore, the water freezes, chokes the capillary of a refrigeration cycle, and disturbs the pressure balance. The volume resistivity of the compounds is low as described as the problem (2), so that the electrical insulating properties are deteriorated. When the total acid value is increased as described as the problem (3), the compounds are hydrolyzed to become unstable.

As described above, flon 134a which is used as a substitute refrigerant for conventional refrigerant flon 12 involves the following fatal problem. Because of its unique molecular structure, flon 134a has a low affinity for mineral oil type and alkylbenzene oil type refrigerating machine oils which have heretofore been used, and hence it lacks miscibility with the refrigerating machine oils which is essential in a refrigerant compressor and a refrigerating apparatus.

Attempts have been made to improve the miscibility, but have been accompanied with, for example, the deterioration of the electrical insulating properties, the water problem, and the unstability problems, such as the hydrolysis and the decomposition of the compound by an acid. Each problem is described below in more detail.

SUMMARY OF THE INVENTION (1) A refrigerating machine oil having a bad miscibility cannot be put into practical use in a refrigerant compressor and a refrigerating apparatus from the viewpoint of performance characteristics and reliability, as described below.

In general, when the solubility of a refrigerating machine oil in a refrigerant is low, oil discharged from a compressor is separated in a heat exchanger and the oil component adheres to the wall surface to remain, so that the amount of oil which returns to the compressor is decreased. Consequently, the oil surface in the compressor is lowered and a so-called oil drying-up phenomenon takes place, so that the oiling level is lowered.

When a compressor is exposed to a low-temperature circumstance in a refrigerating apparatus enclosing a large amount of a refrigerant, the following trouble is caused. In a so-called lying-idle state in which liquid refrigerant is present preferentially in the bottom of the compressor, low-viscosity liquid refrigerant which is present in the bottom as a result of two-layer separation is supplied to the sliding surface of a rotating shaft, so that the assurance of a lubricating oil film becomes difficult, resulting in damage to the compressor.

On the other hand, as to the refrigerating apparatus, a refrigerating machine oil which has separated adheres to the inner wall of an evaporator having a low temperature, to form a heat-insulating layer, and therefore it inhibits the heat-transfering capability seriously. Moreover, when this refrigerating machine oil of wax form chokes an expansion mechanism (a capillary tube) or a piping, the amount of the refrigerant circulated is greatly decreased, resulting in a lowered cooling power. As to the compressor, the pressure of sucked gas is lowered and the pressure of discharged gas is increased. Therefore, the heat deterioration of the refrigerating machine oil and damage to bearings are caused, so that the long-term reliability of the refrigerant compressor and the refrigerating apparatus is greatly deteriorated.

Accordingly, a first object of the present invention is to solve such conventional problems and provide a refrigerating apparatus and a refrigerant compressor which are provided with a refrigerating machine oil which is highly miscible with and hence suitable for flon type refrigerants containing no chlorine a typical example of which is flon 134$a$. More specifically the present invention is fundamentally intended to make improvements with respect to, for example, (1) water absorption properties, (2) volume resistivity, and (3) oxidative deterioration, and seek for a novel refrigerating machine oil composition which is miscible with flon 134$a$ under all operation conditions of a refrigerant compressor and a refrigerating apparatus. It is also intended to provide a refrigeration system having excellent performance characteristics, efficiency and reliability in refrigerating apparatus and refrigerant compressors which are different in purposes, by developing at least the following two refrigeration oils: a refrigeration oil for moderate-temperature refrigerating apparatus such as dehumidifiers which achieves a first aim, i.e., attainment of a critical solution temperature of 0° C. or lower; and a refrigeration oil for low-temperature refrigerating apparatus such as refrigerators which achieves a second aim, i.e., attainment of a critical temperature of −30° C. or lower.

(2) In the long run, it is beneficial to the prevention of global warming (GWP) to enhance the coefficient of performance (COP) (which indicates the energy efficiency, i.e., the ratio of the cooling power of a refrigerant compressor to an input) under usual use conditions under which refrigerant compressors and refrigerating apparatus are usually operated.

For reducing the input to a compressor in order to improve the performance characteristics of the compressor, it is necessary to reducve the coefficient of friction on the basis of the hydrodynamic lubrication theory of coaxial bearing. For the reduction, it is necessary to measure the solubility of flon 134$a$ in the refrigerating machine oil used in the present invention and thereby determine the optimum value of the actual viscosity of the oil used in the compressor. When the actual viscosity is thus optimized, the coefficient of friction of a bearing becomes minimum and the coefficient of performance of the compressor and a refrigerating apparatus using the compressor becomes maximum.

Therefore, a second object of the present invention is to attain high performance characteristics and a high reliability by specifying a viscosity range of the refrigerating machine oil which is most suitable for a refrigerating apparatus using a high-pressure vessel type rotary compressor or a low-pressure vessel type reciprocating compressor, on the basis of the above bearing theory.

(3) However, although very rarely in practice, there is carried out an extremely severe operation such as operation in a high-temperature circumstance or overload operation which are more severe than expected by a designer. Also in this case, a sufficient reliability should be assured.

In a compressor using flon 134$a$, scoring or seizing of the sliding portion of a bearing of the compressor tends to take place more often than in a compressor using a conventional refrigerant flon 12, in a so-called boundary lubrication region (in which contact between metal surfaces occurs) beyond the hydrodynamic lubrication region of a coaxial bearing.

When contact between metal surfaces takes place in the sliding portion of a bearing, flon 12 dissolved in an oil is decomposed to form a conversion coating of iron chloride on an iron-based sliding frictional surface. This iron chloride acts as an extreme pressure agent to suppress the adhesion and seizing.

On the other hand, since flon 134$a$ is a refrigerant containing no chlorine, chlorine cannot possibly be supplied to a compressor using flon 134$a$. Therefore, unlike flon 12, flon 134$a$ is hardly expected to have the above action as extreme pressure agent.

Accordingly, a third object of the present invention is to provide a refrigerating apparatus and a refrigerant compressor in which by using a flon type refrigerant containing no chlorine represented by flon 134$a$ and a refrigerating machine oil containing an extreme pressure agent, the prevention of scoring and seizing of the sliding portions and the assurance of sufficient reliability can be achieved even when the oil runs out in the sliding bearing of the compressor and extremely severe operation is carried out.

(4) A fourth object of the present invention is to provide a refrigerant compressor and a refrigerating apparatus which use a composition comprising a flon type refrigerant containing no chlorine represented by flon 134$a$ and a refrigerating machine oil, and have an electrical insulating system wherein electrical insulating materials such as an electrical insulating film and an insulation-coated winding wire which constitute an electric motor section have a sufficient long-term reliability.

(5) Flon 134$a$ has a high water absorption rate and refrigerating machine oils miscible with flon 134$a$ are relatively hydrophilic though fairly improved. Therefore, both of them tend to carry water into a refrigeration cycle. Water in a refrigerating apparatus is frozen in an evaporator on the low-temperature side and chokes a pipe having a small diameter, such as a capillary tube to lower the refrigerating capability. Furthermore, in the long run, the refrigerating machine oil, the refrigerant, electribcal insulating materials, etc. undergo hydrolysis reaction, so that minus characteristics are brought about, for example, the production of an acidic substance and a lowering of the mechanical strength are induced.

Accordingly, a fifth object of the present invention is to provide a refrigerating apparatus in which a flon type refrigerant containing no chlorine represented by flon 134$a$ and a refrigerating machine oil coexists, and which has a dryer packed with a drying agent effective in improving the reliability of the refrigerating apparatus by separating and adsorbing only water without absorbing the refrigerant.

PREFERRED EMBODIMENT OF THE INVENTION

Figure 1:
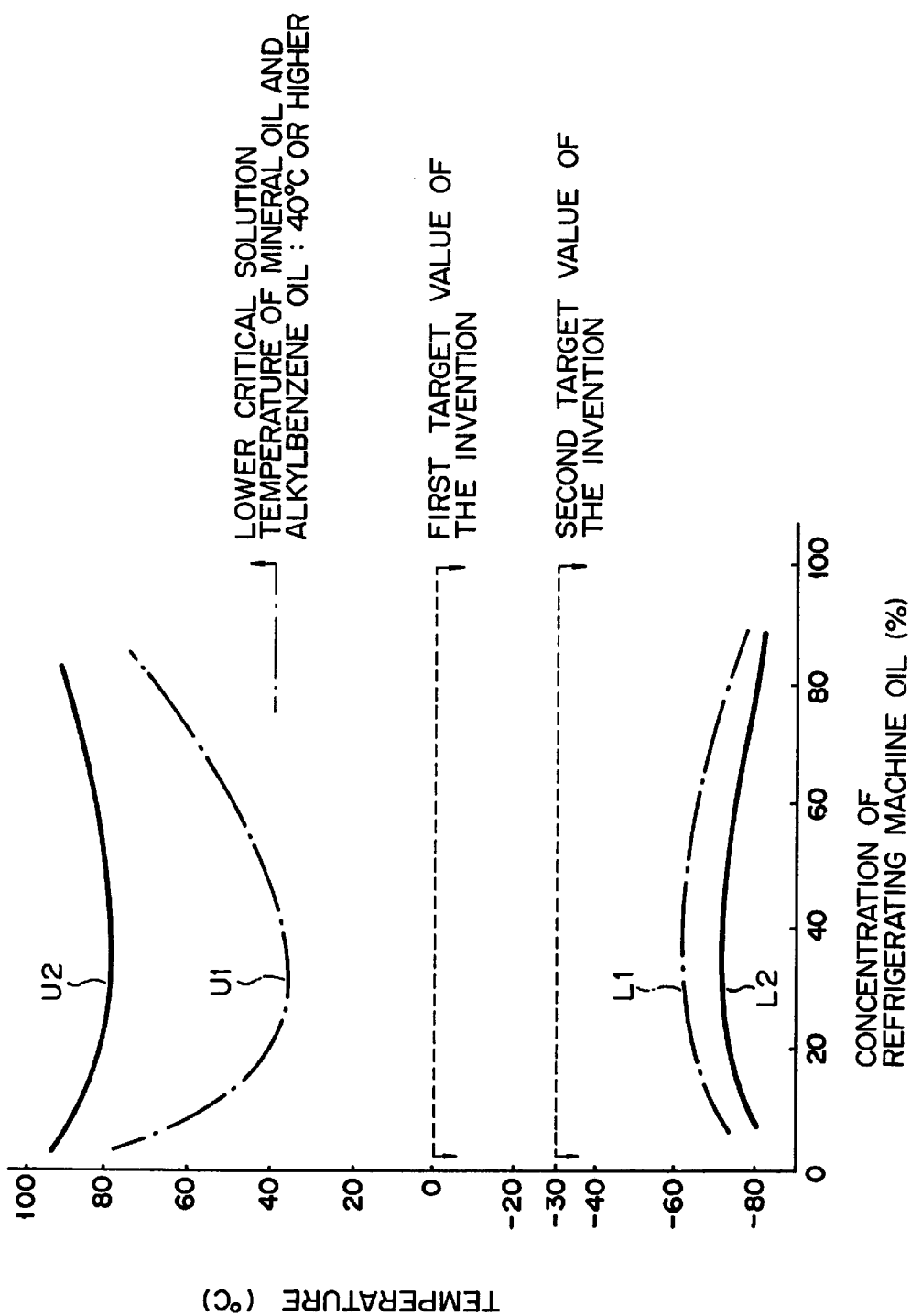
FIG. 1 is a graph showing a two-layer separation temperature which illustrates the miscibility of flon 134a with each refrigerating machine oil.

1. The above first object of the present invention can be achieved by a refrigerating apparatus comprising a refrigeration cycle comprising at least a compressor, condenser, dryer, expansion mechanism and evaporator, a refrigerant compomsed mainly of a fluorocarbon type refrigerant containing no chlorine and having a critical temperature of 40° C. or higher, and a refrigerating machine oil comprising as base oil an ester oil of one or more fatty acids which contains at least two ether linkages

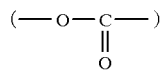

in the molecule and has a viscosity at 40° C. of 2 to 70 cSt and a viscosity at 100° C. of 1 to 9 cSt.

As described above, it is absolutely necessary for the ester oil to be an ester of one or more fatty acids which contains at least two ester linkages in the molecule. Ester oils of one or more fatty acids which have one ester linkage have a bad miscibility with the refrigerant and hence cannot be used.

The usable ester oil of one or more fatty acids can be obtained by the esterification reaction of an alcohol with one or more fatty acids. As the alcohol, a polyhydric alcohol is preferable. As the fatty acids, those having 1 to 6 carbon atoms are preferable. The fatty acids may be either monobasic or polybasic. The ester oils include hindered ester oils and complex ester oils. From the viewpoint of the miscibility with the refrigerant, ester oils having a branched-chain structure tend to be preferable to ester oils having a straight-chain structure. Examples of practical ester oils of one or more fatty acids are given below by the general formulas (1) to (5).

The ester oils represented by the formulas (1) to (4) are hindered ester oils, and the ester oils represented by the formula (5) are complex ester oils.

These ester oils may be used singly or in combination of two or more thereof. The refrigerating machine oil comprise at least 50 wt % of these ester oils as base oil, and the balance may be made up by other well-known refrigerating machine oils.

 (1)

(examples of esters of neopentyl glycol (abbreviated as NPG) type alcohols which contain two ester linkages in the molecule).

 (2)

(examples of esters of trimethylolalkylpropanes (abbreviated as TMP) which contain three ester linkages in the molecule).

 (3)

(examples of esters of pentaerythritol (abbreviated as PET) which contain 4 ester linkages in the molecule).

 (4)

(examples of esters of dipentaerythritol (abbreviated as DPET) which contain 6 ester linkages in the molecule).

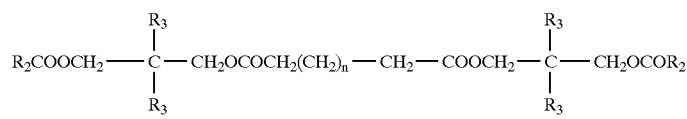 (5)

(examples of complex esters containing 4 or more ester linkages in the molecule).

In the above general formulas, $R_1$ is H or an alkyl group having 1 to 3 carbon atoms, $R_2$ is a straight or branched-chain alkyl group having 5 to 12 carbon atoms, $R_3$ is an alkyl group having 1 to 3 carbon atoms, $R_3$ is an alkyl group having 1 to 3 carbon atoms, and n is an integer of 0 to 5.

The esters represented by the above general formulas (1) to (4) are esters of polyhydric alcohols and monocarboxylic acids. As such esters, esters having a desired viscosity grade can be obtained by optionally choosing a combination of the alcohol and one or a plurality of the monocarboxylic acids and proportions of these components.

As the complex esters represented by the general formula (5), esters having a high viscosity and a wide critical solution temperature range can be obtained by selecting the chemical structure of the central dibasic acid (dicarboxylic acid) component from various chemical structures derived from succinic acid (n=2), glutaric acid (abbreviated as Glut), adipic acid (abbreviated as AZP), pimelic acid, suberic acid, azelaic acid, and sebacic acid (n=8), selecting the polyhydric alcohol component and the terminal monocarboxylic acid component from various compounds, and varying the blending proportions (molar fraction).

The monocarboxylic acids represented by the formula $R_2COOH$ may be straight- or branched-chain ones. The latter includes 2-ethylhexanoic acid (2EH), 2-methylhexanoic acid (i-$C_7$), 3,5,5-trimethylhexanoic acid, 3,5-dimethylhexanoic acid (i-$C_8$), 2-methyl-heptanoic acid. The monocarboxylic acids may be used singly or in combination of two or more thereof.

The base oil of the refrigerating machine oil is prepared by adjusting the viscosity by using such hindered ester oils and complex ester is singly or in combination of two or more thereof.

The refrigerant composed mainly of a fluorocarbon type refrigerant containing no chlorine and having a critical temperature of 40° C. or higher which is used in the present invention includes hydrofluorocarbons and fluorocarbons. Specific examples of the hydrofluorocarbons are difluoromethane (R32), pentafluoroethane (R125), 1,1,2,2-tetrafluoroethane (R134), 1,1,1,2-tetrafluoroethane (R134a), 1,1,2-trifluoroethane (R143), 1,1,1-trifluoroethane (R143a), 1,1-difluoroethane (R152a) and monofluoroethane (R161). Specific examples of the fluorocarbons are hexafluoropropane (C216) and octafluorocyclobutane (C318). Of these, 1,1,2,2-tetrafluoroethane (R134), 1,1,1,2-tetrafluoroethane (R134a), 1,1,2-trifluoroethane (R143), 1,1,1-trifluoroethane (R143a) and hexafluoropropane (C216) have a boiling point close to that of a conventional refrigerant, dichlorodifluoromethane (R12), and are preferable as substitute refrigerants. The above-exemplified hydrofluorocarbon or fluorocarbon type refrigerants can be used singly or as a mixture thereof.

The reason for the adjustment of critical temperature of the refrigerant to 40° C. or higher is that there was required a refrigerating apparatus in which the condensation temperature in a condenser was 40° C.

1) The above second object of the present invention is, for one thing, achieved by a high-pressure vessel type refrigerant compressor used in a refrigeration cycle that comprises a closed vessel stored with a refrigerating machine oil which accommodates a motor composed of a rotor and a stator, a rotating shaft fitted in the rotor, and a compressor section connected to the motor through the rotating shaft, and in which a high-pressure refrigerant gas discharged from the compressor section resides, said refrigerant being composed mainly of a fluorocarbon type refrigerant containing no chlorine and having a critical temperature of 40° C. or higher, and said refrigerating machine oil comprising as base oil an ester oil of one or more fatty acids which contains at least two ester linkages

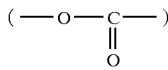

in the molecule and has a viscosity at 40° C. of 2 to 70 cSt and a viscosity at 100° C. of 1 to 9 cst.

The constitution of the ester oil of one or more fatty acids which contains at least two ester linkages in the molecule is as described above in detail.

In a high-pressure vessel type rotary compressor, for example, is previously enclosed the aforesaid refrigerating machine oil having a viscosity at 40° C. of 2 to 70 cSt, preferably 5.0 to 32 cSt, so that the actual viscosity (at a gas pressure of 9 to 11 $kg/cm^2$ abs and an oil temperature of about 100° C.) of the oil which contains flon 134a dissolved therein may be 1.0 to 4.0 cSt.

2) In addition, the above second object of the present invention is achieved by a low-pressure vessel type refrigerant compressor that comprises a closed vessel stored with a refrigerating machine oil which accommodates a motor composed of a rotor and a stator, a rotating shaft fitted in the rotor, and a compressor section connected to the motor through the rotating shaft, and from which a high-pressure refrigerant gas discharged from the compressor section is directly exhausted, said refrigerant being composed mainly of a fluorocarbon type refrigerant containing no chlorine and having a critical temperature of 40° C. or higher, and said refrigerating machine oil comprising as base oil an ester of one or more fatty acids which contains at least two ester linkages

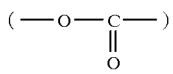

in the molecule and has a viscosity at 40° C. of 2 to 70 cSt and a viscosity at 100° C. of 1 to 9 cSt.

The constitution of the ester oils of one or more fatty acids which contains at least two ester linkages in the molecule is as described above.

In a low-pressure vessel type reciprocating compressor, for example is previously enclosed the aforesaid refrigerating machine oil having a viscosity at 40° C. of 5.0 to 15 cSt and a viscosity at 100° C. of 2.0 to 4.0 cSt, so that the actual viscosity (at a sucked gas pressure of 1.0 to 2.0 kg/cm abs and an oil temperature of 85° C.) of the oil which contains flon 134a dissolved therein may be 2.0 to 4.5 cSt.

3) The above third object can be achieved by adding an extreme pressure agent to the aforesaid refrigerating machine oil.

The extreme pressure agent serves as an abration-preventing agent in sliding portions and includes, for example, alkylpolyoxyalkylene phosphate esters represented by the general formulas (6) and (7) and dialkyl phosphate esters represented by the general formula (8):

(6)

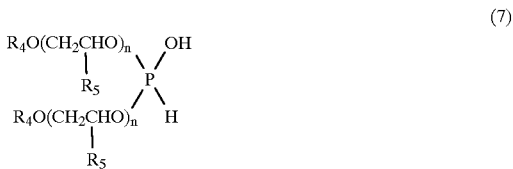

(7)

wherein $R_4$ is an alkyl group having 1 to 8 carbon atoms, and $R_5$ is H or an alkyl group having 1 to 3 carbon (molecular weight: 400 to 700).

(8)

wherein $R_6$ is an alkyl group having 8 to 16 carbon atoms.

These phosphoric esters may be added singly or in combination of two or more thereof. The practical amount of the phosphoric esters added to the refrigerating machine oil is 0.05 to 10 wt %.

It is also effective to add an acid-capturing agent, antioxidant, defoaming agent, etc. together with the extreme pressure agent (the abrasion-preventing agent).

When an acid component is present in the refrigerating machine oil, the ester oil is decomposed by the acid component to become unstable. Therefore, the acid-capturing agent is added for removing the acid component. For example, compounds such as epoxy compounds reactive with acids are preferable as the acids-capturing agent. Particularly preferable examples of the acid-capturing agent are compounds having an epoxy group and an ether linkage, for example, diglycidyl ether compounds such as polyalkylene glycol diglycidyl ethers; monoglycidyl ether compounds such as phenyl glycidyl ether; and aliphatic cyclic epoxy compounds. The reason is that the epoxy group of such a compound captures an acid and that the ether linkage contributes to the improvement of the miscibility of the refrigerating machine oil with the refrigerant to a certain extent.

The other additives described above are, for example, chlorine-capturing agents for preventing the influence of residues of, for instance, a chlorine-containing detergent used for producing the compressor or the refrigerating apparatus, additives for preventing oxidative deterioration during the circulation and storage of the oil, and additives for preventing foaming. These additives may be selected from those used in the conventional general techniques and are not critical in the present invention.

4) For achieving the fourth object, the insulating film constituting an electric motor section and the insulation-coated winding wire which are described below are used in a refrigerating apparatus and a refrigerant compressor which simultaneously use a flon type refrigerant containing no chlorine represented by flon 134a and a refrigerating machine oil comprising as base oil the above-exemplified ester oil of one or more fatty acids. As the insulating film, there is used a crystalline plastics film having a glass transition temperature of 50° C. or higher, or a composite film obtained by coating a film having a low glass transition temperature with a resin layer having a high glass transition temperature. As the insulation-coated winding wire, there is used an enameled wire having the enamel coating of a glass transition temperature of 120° C. or higher, or an enameled wire having a composite coating consisting of a lower layer having a low glass transition temperature and a upper layer having a high glass transition temperature.

As the insulating film, for practical purposes, it is preferable to use at least one kind of insulating film selected from the group consisting of films of polyethylene terephthalates, polybutylene terephthalates, polypenylene sulfides, polyether ether ketones, polyethylene naphthalates, polyamide-imides and polyimides. As an enamel coating, it is preferable to use at least one kind of insulating layer selected from the group consisting of insulating layers of polyester imides, polyamides and polyamide-imides.

5) For achieving the fifth object, a synthetic zeolite composed of a composite salt consisting of alkali metal silicates and alkali metal aluminates which has a pore diameter of 3.3 angstrom or less and a carbon dioxide gas absorption capacity (at 25° C. and at a partial pressure of carbon dioxide gas of 250 mmHg) of 1.0% or less, is used as a drying agent to be packed into the dryer, in the aforesaid refrigerating apparatus which simultaneously uses a flon type refrigerant containing no chlorine represented by flon 134a and a refrigerating machine oil comprising as base oil the above-exemplified ester oil of one or more fatty acids.

In a refrigerating apparatus comprising at least a compressor, condenser, expansion mechanism and evaporator, and using a flon type refrigerant containing no chlorine represented by flon 134a, the refrigerating machine oil according to the present invention which comprises at least one ester selected from the group consisting of hindered or complex esters containing two or more ester linkages in the molecule, and has a viscosity at 40° C. of 2 to 70 cSt, preferably 5 to 32 cSt, and a viscosity at 100° C. of 1 to 9 cSt, preferably 2 to 6 cSt, has a good miscibility with the refrigerant in the whole temperature ranges of the parts used in the refrigerating apparatus. Therefore, there is no two-layer separation between the refrigerant and the refrigerating machine oil. Accordingly, no two-layer separation is present in the oil-storing space in the compressor, so that the supply of the oil to the sliding portions of hearings is assured, and flon gas discharged from the compressor is in a liquefied state by the condenser, namely, in a state in which the oil is always dissolved in flon 134a with a low viscosity in a low-temperature circumstance of −30° C. or lower in the evaporator. Thus, on the whole, the flon gas is in a low-viscosity state, so that the return of the oil to the compressor is improved.

Therefore, the lowering of oil surface in the compressor is prevented and hence the supply of the oil to the sliding portions of hearings can be assured. Thus, the problems causing scoring and seizing can be solved.

Furthermore, unlike conventional polyoxyalkylene glycol oils, the aforesaid refrigerating machine oil has a low saturated water-content of one-tenth or less as large as that of the conventional oils, a large improving effect on the stability to oxidative deterioration, and a volume resistivity of $10_{13}$ Ωcm which is as high as that of an electrical insulating oil. Therefore, in a refrigerant compressor comprising a pressure vessel accommodating a motor section and a refrigerating apparatus using the refrigerant compressor, the refrigerating machine oil according to the present invention do not separate from flon 134a and has excellent characteristics with respect to both the performance characteristics and reliability of the compressor. Since the refrigerating machine oil has an excellent miscibility also with conventional chlorine-containing flon refrigerants such as flon 12 and flon 22, such conventional chlorine-containing refrigerants can, if necessary, be used in place of a portion of flon 134a in admixture with flon 134a.

When the refrigerating machine oil according to the present invention which had an oil viscosity at 40° C. of 5 to 32 cSt was enclosed in a high-pressure vessel type rotary compressor and the coefficient of performance of the compressor was measured, the coefficient of performance reached a peak in the case of using the oil which had a viscosity of 15 cSt. When the oil which had a viscosity of 5 to 32 cSt was used, the coefficient of performance was about 1.4 or more which corresponds to a value of 0.95 to 0.93 when the coefficient of performance in the case of using a conventional combination of a flon 12 and an alkylbenzene oil is taken as 1. Such a value indicates that the oil involves no practical problem. The refrigerating machine oil according to the present invention which had a viscosity at 40° C. of 56 cSt was found to be superior in the coefficient of performance of the compressor to polyoxypropylene glycol oils. The reason for this superiority is as follows. The ester linkages contained in the oil itself undergoes molecular orientation mainly on the surfaces of iron-based sliding portions of the shaft and bearings of the compressor to improve the lubrication. Moreover, the oil is decreased in actual viscosity owing to its high solubility in flon 134a, to reduce the mechanical loss. These effects are synergistically brought about to improve the coefficient of performance of the compressor.

On the other hand, in the case of a low-pressure vessel type reciprocating compressor, the amount of flon 134a dissolved and the actual viscosity vary only in narrow ranges because the compressor is operated at a low pressure in the vessel of 1 to 2 kg/cm² abs. Therefore, characteristics of a refrigerant and a refrigerating machine oil are hardly dependent on their kinds, and it was found that the oil which had a viscosity at 40° C. of 5 to 15 cSt and a viscosity of 100° C. of 2 to 4 cSt was good in reliability and performance characteristics.

When the refrigerating machine oil according to the present invention is blended with an adequate amount (0.05 to 10 wt %) of an extreme pressure agent such as a strong primary or secondary phosphoric ester retaining OH groups in the molecule, for example, an alkylpolyoxyalkylene phosphate ester or a dialkyl phosphate ester, the resulting blend can push away a lubricating oil film having ester linkages undergoing molecular orientation on the surfaces of iron-based sliding portions constituting the shaft and bearings of the compressor, and form a stronger chemical adsorption film of the phosphoric ester. Therefore, the blend can further improve the lubrication of the sliding portions to prevent scoring and seizing.

Figure 6:
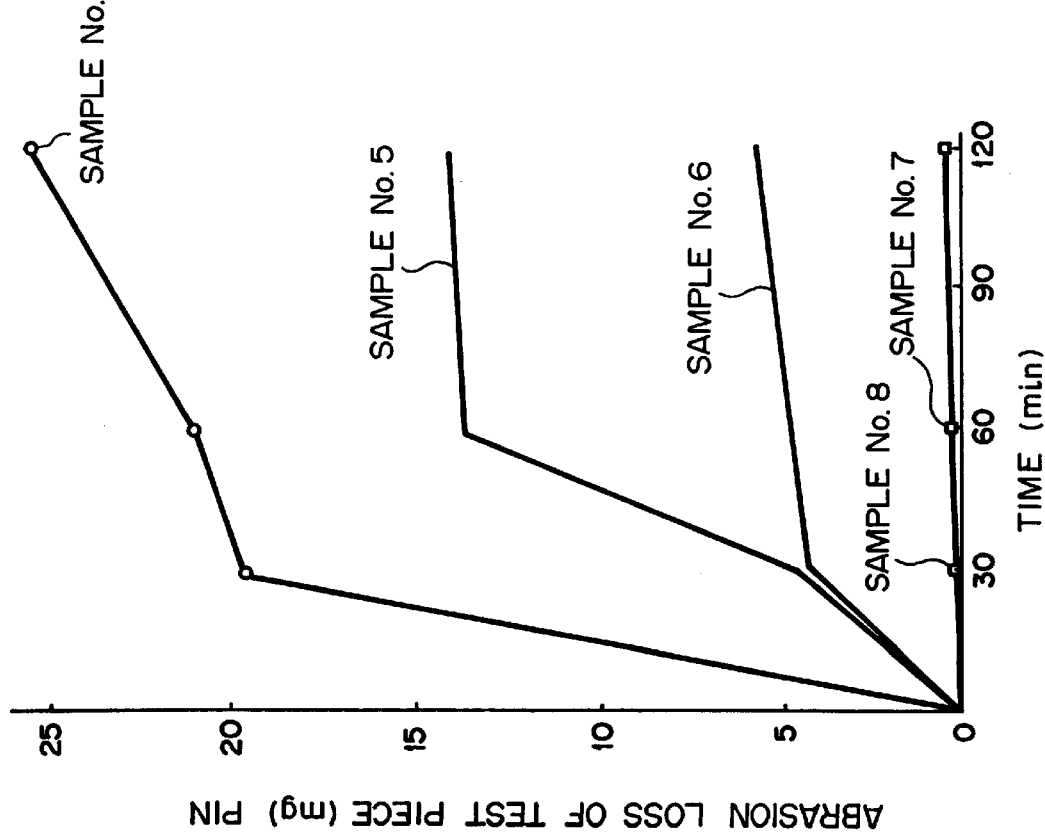
FIG. 6 is a graph showing the abration loss caused by a FALEX test.

When the lubricating properties of the refrigerating machine oil according to the present invention containing the extreme pressure agent were examined, the critical seizing pressure on surface was greatly increased in a FALEX test (a seizing test on the oil) carried out without the dissolution of flon 134a in the oil. In addition, when there was measured the abrasion loss of an iron-based sliding member in the case of employment of the refrigerating machine oil containing the extreme pressure agent which further contained 50% of flon 134a dissolved therein, as simulation of the dissolution of a high concentration of flon 134a, the abrasion loss could be reduced to one-fifth or less as large as that caused in the case of the oil which did not contain the extreme pressure agent. The suitable range of the amount of the extreme pressure agent added is 0.05 to 10 wt % as described above. The results of the abrasion loss test are as shown in FIG. 6 though specifically described in the examples herein-after given. As shown in FIG. 6, the reducing effect of the addition of the extreme pressure agent on the abrasion loss is remarkable.

Conventional additives such as an acid-capturing agent, antioxidant, defoaming agent, etc. can be blended together with the extreme pressure agent.

Next, there are explained below electrical insulating materials for the refrigerant compressor using flon 134a together with the refrigerating machine oil according to the present invention. As an insulating film used as electrical insulating material for the motor section, a crystalline plastics film having a glass transition temperature of 50° C or higher is used. The insulating film includes films of polyethylene terephthalates, polybutylene terephthalates, polyphenylene sulfides, polyether ether ketones, polyethylene naphthalates, polyamide-imides and olyimides; and composite films obtained by coating a film having a low glass transition temperature with a resin layer having a high glass transition temperature. These films are hardly deteriorated in tensile strength characteristics and electrical insulating characteristics and involve no practical problem. This is because the films carry in a much smaller amount of water and produce a much smaller amount of an acid than do conventional polyoxyalkylene glycol oils, and hence are hardly deteriorated by hydrolysis of the films themselves.

An enamel coating having a glass transition temperature of 120° C. or higher is used on a magnet wire used in the motor section. The enamel coating includes, for example, monolayers of polyester imides, polyamides, polyamide-imides and the like, and composite enamel coating films obtained by forming an upper layer having a high glass transition temperature on a lower layer having a low glass transition temperature. Like the above-mentioned films, these enamel coatings hardly show deterioration by hydrolysis, cracking, softening, swelling, a lowering of breakdown voltage, etc. and hence are useful for improving the reliability in practical. In some cases, a self-lubricating agent or an external lubricating agent is included in the enamel coating on the magnet wire, for imparting self-lubricating properties to improve the electrical workability. Fundamentally, the above characteristics of the enamel coating itself before the inclusion are retained.

Lastly, a drying agent packed into the dryer of the refrigerating apparatus in which flon 134a and the aforesaid refrigerating machine oil according to the present invention coexist is explained below. In this invention, it is preferable to use a synthetic zeolite composed of a composite salt consisting of alkali metal silicates and alkali metal aluminates which has a pore diameter of 3.3 angstrom or less, a carbon dioxide absorption capacity at 25° C. and at a carbon dioxide partial pressure of 250 mmHg of 1.0% or less. As such a synthetic zeolite, XH-9 and XH-600 (trade names, mfd. by UNION SHOWA K.K.) can be exemplified. Both of them have a small fluorine ion adsorption. The same synthetic zeolite as above except for having a carbon dioxide gas adsorption capacity of 1.5% or more has a fluorine adsorption of as large of 0.24% or more and hence possesses deteriorated adsorption characteristics and breaking strength as molecular sieves. Moreover, corroded crystal disintegration product of such a synthetic zeolite chokes the piping of the refrigeration cycle or injures the sliding portions of bearings of the compressor. When the pore diameter in the present invention is specified in relation to the above carbon dioxide adsorption capacity in consideration of such conditions, the troubles described above are not caused and it becomes possible to compose a highly reliable refrigerating apparatus.

Examples of the present invention are explained below with reference to FIGS. 1 to 6 and Tables 1 to 4.

Examples 1 to 17

These examples show embodiments for achieving the above first object of the present invention. In a closed rotary compressor concerned with a refrigeration cycle and a refrigerant compressor, flon 134a was used as a refrigerant, and as a refrigerating machine oil, there was used each ester oil listed in Table 1 which contained two or more ester groups in the molecule and had a viscosity at 40° C. of 2 to 70 cSt and a viscosity at 100° C. of 1 to 9 cSt. For comparison, data on conventional refrigerating machine oils are also shown in Table 1.

FIG. 1 is a graph showing two-layer separation temperature which illustrates the miscibility of flon 134a with each refrigerating machine oil. The graph was obtained by enclosing flon 134a and the refrigerating machine oil in a high-pressure glass vessel, observing visually the two-layer separation state at each temperature and at each concentration of the refrigerating machine oil, and summarizing the observation results. The axis of abscissa refers to the concentration of the oil in flon 134a, and the axis of ordinate to temperature. The first target value shown in FIG. 1 is a lower critical solution temperature necessary for a refrigerating apparatus such as a dehumidifier, which has a moderate evaporator temperature (0° C. or lower). The second target value is a lower critical solution temperature necessary for a refrigerating apparatus such as a refrigerator, which has a low evaporator temperature (-30° C. or lower). Both of the evaporator temperatures are specified values.

From Table 1, it can be seen that SUNISO 4GSD (a trade name, naphthene type) and Z300A (a trade name, alkylbenzene type) both manufactured by JAPAN SUN OIL Co., Ltd. were not dissolved. A polyalkylene glycol, PAG56 (a trade name, mfd. by JAPAN SUN OIL Co., Ltd.) had a lower critical solution temperature (shown by L1) of -60° C. and an upper critical solution temperature (shown by U1) of 35° C. The ester oils containing two or more ester groups in the molecule according to the present invention are so excellent in critical solution temperatures that their lower critical solution temperature (shown by L2) is -70° C. and their upper critical solution temperature (shown by U2) 70° C. or higher. The lower critical solution temperatures is an important factor for practical purposes in the heat exchanger of a refrigerating apparatus, and the upper critical solution temperature is an important factor for practical purposes in a refrigerant compressor.

Figure 7:
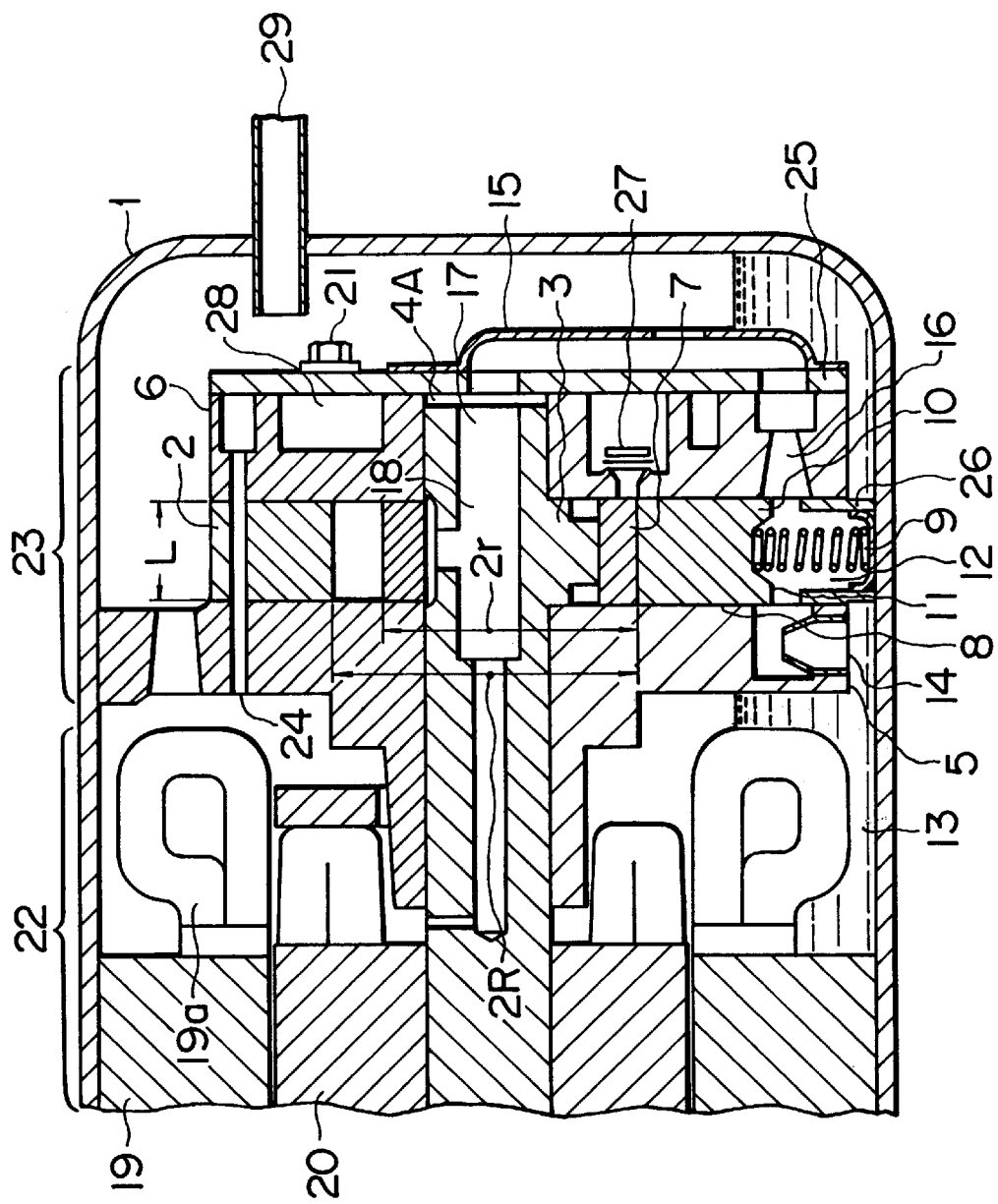
FIG. 7 is a vertical cross-sectional view of the principal part of a closed rotary compressor.
Figure 8:
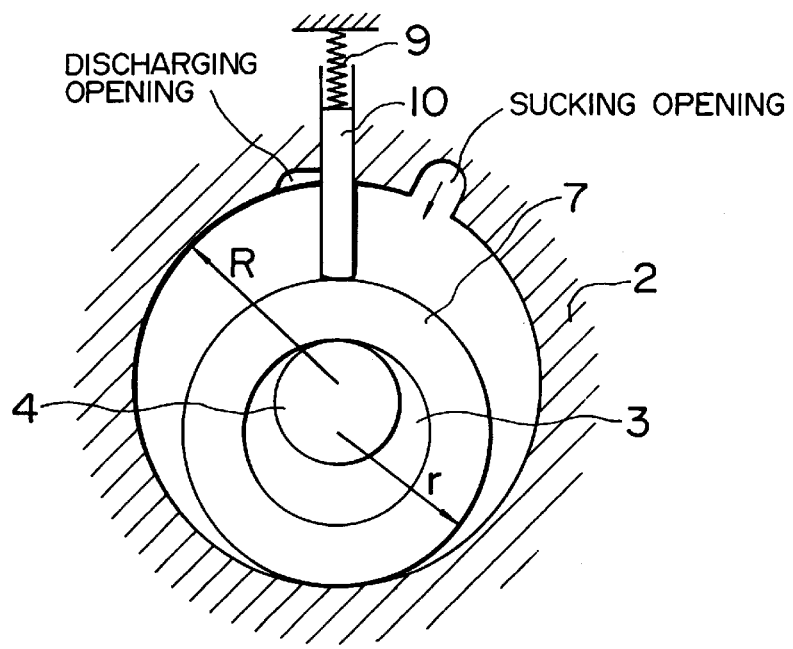
FIG. 8 is a vertical cross-sectional view of the principal part of the compression mechanical part of a rotary compressor.
Figure 9:
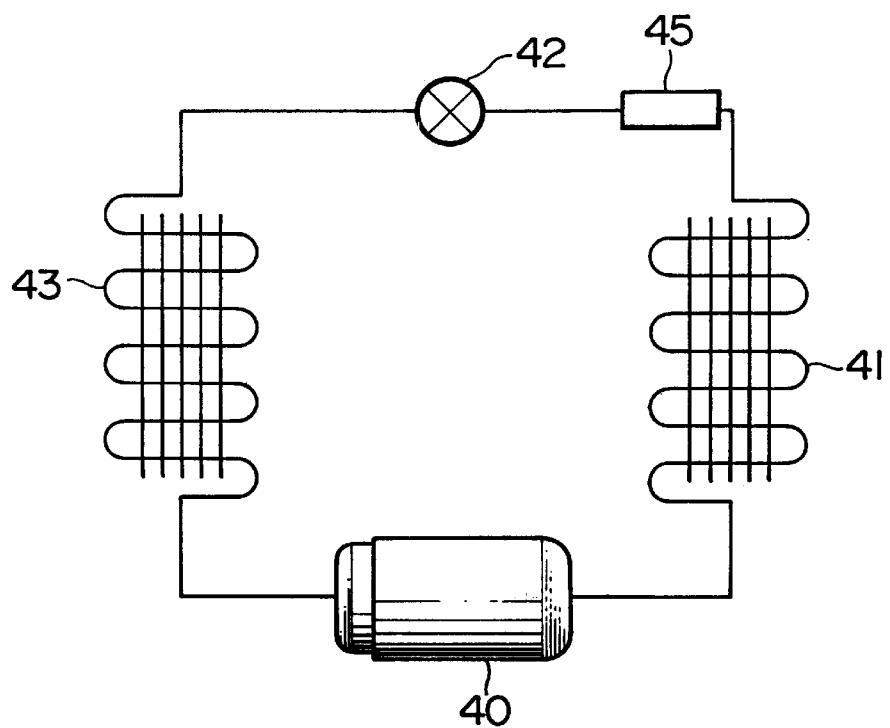
FIG. 9 is a diagram showing the structure of the refrigeration cycle of a refrigerating apparatus.

FIG. 9 is a diagram showing the structure of the refrigeration cycle of a refrigerating apparatus. The refrigerating apparatus comprising a refrigerant compressor 40, a condenser 41, a dryer 45, an expansion mechanism 42 and an evaporator 43 was operated by using each of the above-mentioned refrigerating machine oils together with flon 134a. Consequently, in the case of SUNISO 4GSD (a naphthenic mineral oil) and Z300A (an alkylbenzene oil) (trade names, mfd. by JAPAN SUN OIL Co., Ltd.), when the refrigerant was present in a large amount and lay idle in the compressor, a refrigerant layer having a high density and a refrigerating machine oil layer having a low density were present merely as a lower layer and an upper layer, respectively, owing to two-layer separation. Therefore, as shown in FIG. 7, i.e., the vertical cross-sectional view showing the principal part of a refrigerant compressor (an example of closed rotary compressor), oil supply to a shaft 4A, a main bearing 5 and a sub-bearing 6 is carried out by suction of the refrigerant layer present merely as the lower layer through the suction opening 14 of a pump. The refrigerant layer has a lower viscosity than does the refrigerating machine oil. Therefore, when the refrigerant layer is supplied to the bearings, the resulting oil film is thin, so that contact between metal surfaces tends to occur. In addition, since the temperature of sliding frictional surfaces rises at once, the refrigerant was gasified, resulting in more severe conditions. When this phenomenon is repeated, damages due to scoring and seizing are caused in the shaft and the bearings, so that the performance characteristics of the refrigerant compressor are lost.

When the conventional refrigerating machine oil is used in the heat exchanger of the refrigerating apparatus shown in FIG. 9, for example, the evaporator 43 used at 0° to -60° C., the refrigerating machine oil which has been discharged together with gas of the refrigerant from the compressor 40 undergoes two-layer separation in the evaporator 43 and adheres to the inner wall of the piping of the heat exchanger, and there is caused the residence of the refrigerating machine oil or the heat insulation of the heat exchanger. Therefore, the conventional refrigerating machine oils greatly deteriorate the cooling capability of the refrigerating apparatus and are of no practical use. In this point, the polyalkylene glycol listed as Conventional Example 3 in Table 1 is advantageous because it has a lower critical solution temperature of -60° C. and hence does not undergo two-layer separation in the evaporator 43. But, owing to its upper critical solution temperature of 35° C., it completely undergoes two-layer separation because the temperature of the compressor 40 during operation becomes at least 80° C. As in the case of Conventional Examples 1 and 2, when the polyalkylene glycol is supplied to the bearings, damages due to scoring and seizing are caused in the shaft and the bearing, so that the refrigerant compressor loses its performance characteristics.

In a refrigerant compressor having a hermetic motor, for example, the rotary compressor shown in FIG. 7, a refrigerating machine oil is, of course, required to have characteristics as an electrical insulating oil.

Figure 2:
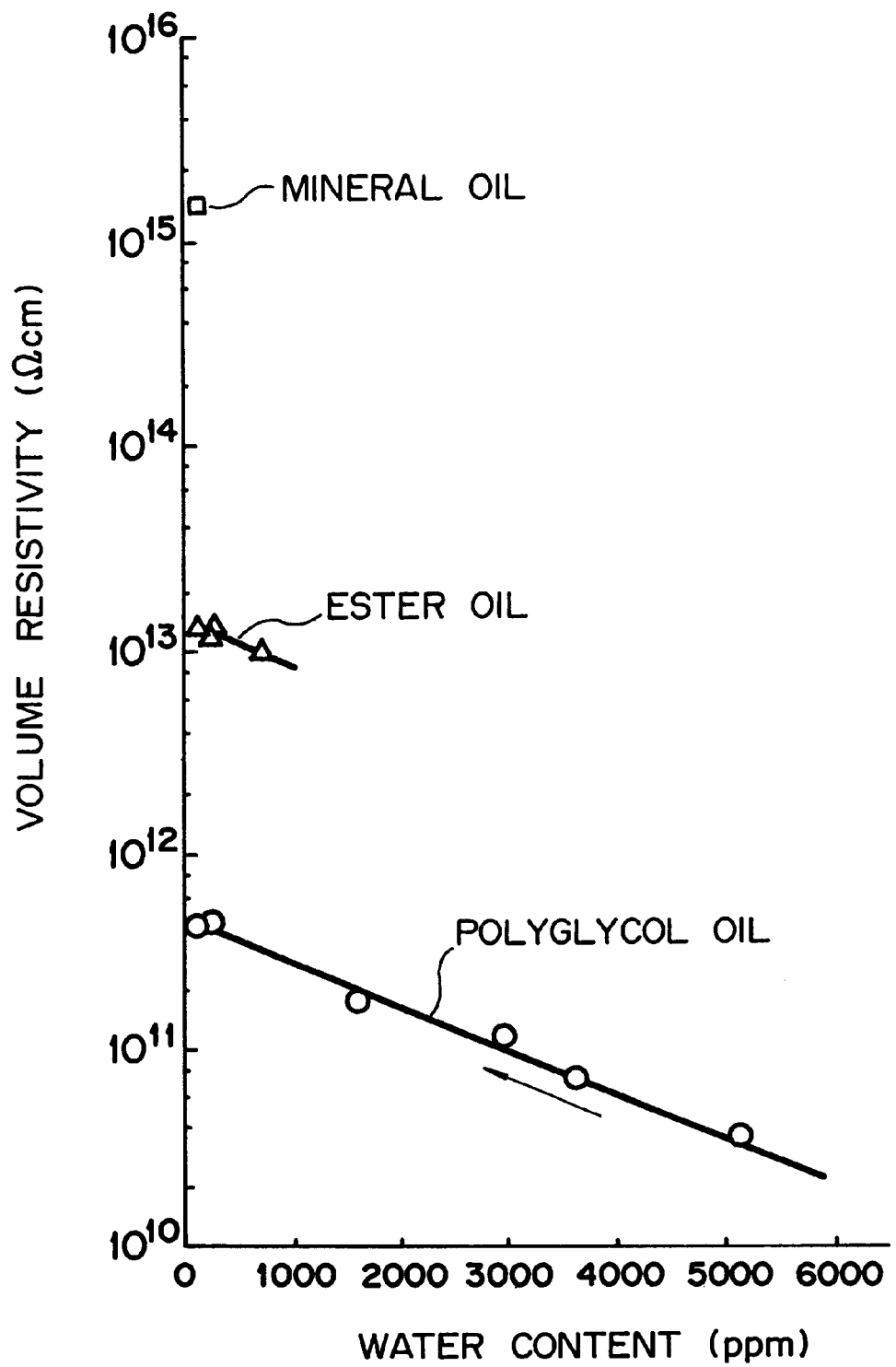
FIG. 2 is a graph showing a relationship between the amount of water dissolved in each of various refrigerating machine oils and its volume resistivity.

FIG. 2 shows the relationship between the water absorption and the volume resistivity of each of the ester oils according to the present invention and conventional mineral oil and polyalkylene glycol. Even in a condition in which the water content is controlled to be 500 ppm or less, the polyalkylene glycol as conventional example has a low volume resistivity of $10_{12}$ Ωcm or less owing to the ether linkages in the molecule and hence is not preferable.

On the other hand, the refrigerating machine oil having ester linkages introduced thereinto according to the present invention has a high volume resistivity (a high insulating capability) of $10_{13}$ Ωcm or more which is in accordance with the standard value of electrical insulating oil prescribed in JIS C2320. Therefore, it can be sufficiently put to practical use. Although the mineral oil as conventional example has a high insulating capability, it has a bad miscibility with flon 134a and cannot be put to practical use.

Next, the relationship among the kind, chemical structure and lower critical solution temperature of ester oils suitable for flon 134a is explained below in detail with reference to Table 1.

The ester oil containing two or more ester groups in the molecule which is used in the present invention includes esters of monobasic or polybasic organic acids and polyhydric alcohols. Typical examples of the ester oil are hindered ester oils and complex ester oils which are represented by esters of neophentyl glycol, esters of trimethylolpropane or trimethylolethane, and esters of pentaerythritol. Table 1 shows the relationship amount the name, viscosity and critical solution temperatures of typical chemically synthesized products.

TABLE 1

| Sample refrigerating machine oil | | Viscosity (cSt) | | Critical solution temperature (° C.) | |
|---|---|---|---|---|---|
| | | 40° C. | 100° C. | U (upper) | L (lower) |
| Conventional Example | | | | | |
| 1 | Naphthenic mineral oil (SUNISO 4GSD) | 55.1 | 5.9 | — | >40 |
| 2 | Alkylbenzene oil (SUNISO Z300A) | 60.1 | 6.0 | — | >40 |
| 3 | Propylene glycol monoether (PAG56) | 54.0 | 10.0 | 35 | -60 |
| Example | Note 1 | | | | |
| 1 | NPG/n-$C_8$ | 4.8 | 1.7 | | -29 |
| 2 | NPG/n-$C_7$ | 2.8 | 1.2 | | -61 |
| 3 | NPG/2EH | 7.0 | 2.1 | >80 | -60 |

TABLE 1-continued

| Sample refrigerating machine oil | | Viscosity (cSt) | | Critical solution temperature (° C.) | |
|---|---|---|---|---|---|
| | | 40° C. | 100° C. | U (upper) | L (lower) |
| 4 | NPG/i-C$_7$ | 5.5 | 1.8 | >80 | −70 |
| 5 | NPG/i-C$_{11}$ Note 2 | 14.9 | 3.8 | >80 | −40 |
| 6 | TMP/n-C$_7$ | 13.9 | 3.4 | | −20 |
| 7 | TMP/n-C$_6$ | 10.8 | 2.8 | | −62 |
| 8 | TMP/i-C$_8$ | 32.2 | 5.2 | | −27 |
| 9 | TMP/2EH | 22.0 | 4.2 | | −33 |
| 10 | TMP/i-C$_7$ Note 3 | 14,9 | 3.4 | >80 | −60 |
| 11 | PET/n-C$_6$ | 17.5 | 3.7 | | −44 |
| 12 | PET/2EH | 52.0 | 6.7 | | −8 |
| 13 | PET/i-C$_7$ Note 4 | 28.0 | 4.8 | | −40 |
| 14 | NPG/Glut/n-C$_6$ | 32.6 | 5.9 | >80 | <−75 |
| 15 | NPG/i-C$_7$ + AZP/NPG/n-C$_{10}$ | 29.5 | 5.0 | >80 | −45 |
| 16 | AZP/NPG/n-C$_{10}$ | 54.5 | 7.3 | >80 | −60 |
| 17 | Glut/NPG/i-C$_6$ | 56.6 | 8.6 | >80 | −60 |

Note 1 NPG: esters of neopentyl glycol,

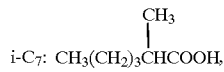

i-C$_7$: CH$_3$(CH$_2$)$_3$CHCOOH, n-C$_7$: CH$_3$(CH$_2$)$_5$COOH, i-C$_{11}$: CH$_3$(CH$_3$)CH(CH$_2$)$_7$COOH
Note 2 TMP: ester of trimethylolpropane,

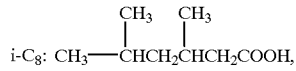

i-C$_8$: CH$_3$—CHCH$_2$CHCH$_2$COOH, n-C$_6$: CH$_3$(CH$_2$)$_4$COOH
Note 3 PTE: esters of pentaerythritol
Note 4: complex esters, n-C$_{10}$: CH$_3$(CH$_2$)$_8$COOH,
i-C$_6$: CH$_3$(CH$_3$)CH(CH$_2$)$_2$COOH Of the sample names in Table 1, the names of chemically synthesized ester oils are abbreviated. For example, in the case of NPG/n-C$_8$, NPG is an abbreviation of neopentyl glycol, n-C$_8$ is an abbreviation of a normal organic acid (a straight-chain fatty acid) having 8 carbon atoms, and NPG/n-C$_8$ denotes an ester of neopentyl glycol and the normal organic acid (the straight-chain fatty acid) having 8 carbon atoms. In the case of NPG/2EH, 2EH is an abbreviation of 2-ethylhexanoic acid and NPG/2EH denotes an ester of neopentyl glycol and 2-ethylhexanoic acid.

1) As shown in Examples 1 to 4, the esters of neopentyl glycol (NPG) are esters of neopentyl glycol as dihydric alcohol and a monocarboxylic acid as monobasic organic acid, and are characterized by containing two ester groups in the molecule. Such a chemical structure has an important bearing on the miscibility with flon 134a and the viscosity characteristics of the oils.

That is, ester oils of a monocarboxylic acid having 7 to 8 carbon atoms were satisfactory and had a lower critical solution temperature of −29° C. to −70° C. and a viscosity at 40° C. of 2.8 to 7.0 cSt.

The smaller the number of carbon atoms of the monocarboxylic acid (the fatty acid), the lower the lower critical solution temperature. It was found that the lower critical solution temperature of the ester of 2-ethylhexanoic acid (2EH) of Example 3 and the ester of isoheptanoic acid (i-C$_7$) of Example 4 which have a branched chain in the molecule is advantageously lower than that of the esters of Examples 1 and 2, respectively. The case of increasing the number of carbon atoms of the carboxylic acid to 11 for increasing the viscosity is Example 5. The ester of Example 5 was found to have a viscosity at 40° C. of 14.9 cSt and a lower critical solution temperature of −40° C. at the lowest.

2) Next, the esters of trimethylolpropanol (TMP) containing three ester linkages in the molecule are explained below with reference to Examples 6 to 10.

The ester oils obtained by the condensation of trimethylolpropane (TMP) as trihydric alcohol and a monocarboxylic acid as monobasic organic acid contain three ester groups in the molecule, and the monocarboxylic acid has 6 to 8 carbon atoms. The ester oils have a viscosity at 40° C. of 10.8 to 32.2 cSt and a lower critical solution temperature of −20° C. to −60° C. Of these ester oils, ester oils having a lower critical solution temperature of −20° C. or lower are the ester oil of heptanoic acid (n-C$_7$) of Example 6, the ester oil of octanoic acid (n-C$_8$) of Example 8 and the ester oil of 2-ethylhexanoic acid (2EH) of Example 9. Ester oils having a lower critical solution temperature of −60° C. or lower are the ester oil of hexanoic acid (n-C$_6$) of Example 7 and the ester oil of isoheptanoic acid (i-C$_7$) of Example 10. The ester oils of Examples 6 to 10 are also characterized in that the smaller the number of carbon atoms, the lower the lower critical solution temperature, and that the lower critical solution temperature of the ester oils containing a branched chain is lower than that of the ester oils containing no branched chain even when the former ester oils and the latter ester oils have the same number of cabon atoms.

3) As shown in Examples 11 to 13, the ester oils obtained by the condensation of pentaerythritol (PET) as tetrahydric alcohol and a monocarboxylic acid contain 4 ester groups in the molecule, and the monocarboxylic acid has 6 to 8 carbon atoms. The ester oils have a high viscosity at 40° C. of 17.5 to 52.0 cSt and a lower critical solution temperature of −8° C. to −44° C. Thus, the lower critical solution temperature is shifted to higher temperatures, as compared with the above-mentioned ester oils of dihydric alcohols and trihydric alcohols. Of the ester oils of Examples 11 to 13, ester oils having a lower critical solution temperature of −40° C. or lower are the ester oil of hexanoic acid (n-C$_6$) of Example 11 and the ester oil of isoheptanoic acid (i-C$_7$) of Example 13. The ester oils of Examples 11 to 13 are also characterized in that the smaller the number of carbon atoms, the lower the lower critical solution temperature, and that the lower critical solution temperature of the ester oils containing a branched chain is lower than that of the ester oil containing no branched chain.

4) As a method for introducing 4 ester groups into the molecule, there is a method in which esterification is carried out by condensing a polyhydric alcohol and a monocarboxylic acid with a dicarboxylic acid (i.e. a typical dibasic organic acid) as the central constituent. By this method, the lower critical solution temperature can easily be lowered and the viscosity can easily be increased. Esters obtained by such a molecular design are complex esters and are explained with Examples 14 to 17 of the present invention.

Example 14 shows a complex ester of glutaric acid (abbreviated as Glut) as dicarboxylic acid, neopentyl glycol (NPG) as dihydric alcohol, and hexanoic acid (C$_6$) as monocarboxylic acid. This complex ester had a viscosity at 40° C. of 32.6 cSt, a viscosity at 100° C. of 5.9 cSt, and a lower critical solution temperature of −75° C. or lower.

Example 15 shows the case where an ester having moderate viscosity grade was prepared by mixing the esters of Examples 4 and 16. This ester was also found to possess a lower critical solution temperature not much changed.

Example 16 shows a complex ester of adipic acid (abbreviated as AZP) as dicarboxylic acid, neopentyl glycol (NPG) as dihydric alcohol, and decanoic acid (n-$C_{10}$) as monocarboxylic acid. Example 17 shows a complex ester of glutaric acid (Glut) as dicarboxylic acid, neopentyl glycol (NPG) as dihydric alcohol, and isohexanoic acid (i-$C_6$) as monocarboxylic acid. These complex esters were found to be so excellent that they had a viscosity at 40° C. of 54.5 to 56.6 cSt, a viscosity at 100° C. of 7.3 to 8.6 cSt, and a lower critical solution temperature of −60° C. These results indicate that a complex ester having a suitable viscosity can be synthesized by determining properly the number of carbon atoms ($C_2$ to $C_{10}$) of a dicarboxylic acid as dibasic organic acid and the number of carbon atoms ($C_5$ to $C_{10}$) of a monocarboxylic acid as monobasic acid, and condensing the dicarboxylic acid, the monocarboxylic acid, and a polyhydric alcohol in a properly chosen molar ratio.

When these Examples are arranged, the esters can be represented as follows by general formulas:

Esters of neopentyl glycol:

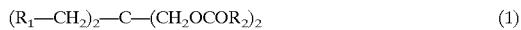  (1)

Esters of trimethylolalkane:

  (2)

Esters of pentaerythritol:

  (3)

Complex esters:

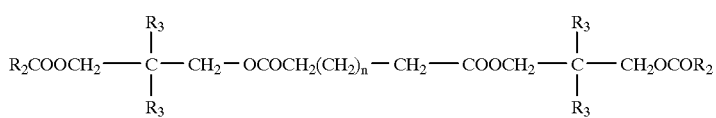  (4)

In addition, examples of easily obtainable esters are esters of dipentaerythritol:

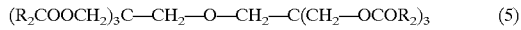  (5)

In the above formulas (1) to (5), $R_1$ is H or an alkyl group having 1 to 3 carbon atoms, $R_2$ is a straight-or branched-chain alkyl group having 5 to 12 carbon atoms, $R_3$ is an alkyl group having 1 to 3 carbon atoms, and n is an integer of 0 to 5.

The viscosity could be optionally determined by choosing the kinds of the polyhydric alcohol and the carboxylic acid(s).

A moderate viscosity could easily be attained by blending a low-viscosity oil and a high-viscosity oil.

In the case of a refrigerating apparatus using a flon type refrigerant containing no chlorine, for example, flon 134a, a refrigerating machine oil capable of imparting fundamentally satisfactory performance characteristics and reliability to a compressor and the refrigerating apparatus can be obtained by selecting an oil having a lower critical solution temperature of 0° C. or lower (the first target value) or an oil having a lower critical solution temperature of −30° C. or lower (the second target value) both of which have a viscosity at 40° C. of 2 to 70 cSt, preferably 5 to 32 cSt and a viscosity at 100° C. of 1 to 9 cSt, preferably 2 to 6 cSt, from the hindered esters and the complex esters which contain two or more ester linkages in the molecule.

It was confirmed that these ester type refrigerating machine oils have a good miscibility not only with flon 134a but also with all flon type refrigerant gases containing no chlorine, for example, flon 152a (difluoroethane $CH_3CHF_2$). The refrigerating machine oils were effective in imparting high performance characteristics and a high reliability to a refrigerating apparatus.

In addition, it was confirmed that since these ester oils according to the present invention are highly soluble also in conventional chlorine-containing flon type refrigerants (chlorofluorohydrocarbon type refrigerants) such as flon 12 and flon 22, they are effective also when used in part in admixture with these refrigerants.

However, since the conventional chlorine-containing flon type refrigerants are included in the list of compounds under regulation in use because of the problem of environmental disruption, it is preferable to adjust the proportion of the refrigerants to 50% or less and that of the ester oil according to the present invention to 50% or more.

Next, an example of refrigerating apparatus for achieving the second object of the present invention is given below.

Example 18

The rotary compressor shown in FIG. 7 which was a refrigerant compressor was incorporated into a refrigerating apparatus having the constitution shown in FIG. 9. At a compressor temperature of 100° C. and a discharged gas pressure of 9.5 to 10 kgf/cm²G which were conditions of examining the reliability of a refrigerator, a relationship between the viscosity of a refrigerating oil stored in the compressor and the coefficient of performance (COP), i.e., the ratio of the refrigerating capacity of the compressor to an input, was measured by using some of the ester oils with a typical viscosity grade exemplified in Table 1. The results obtained are shown in FIG. 3.

Figure 3:
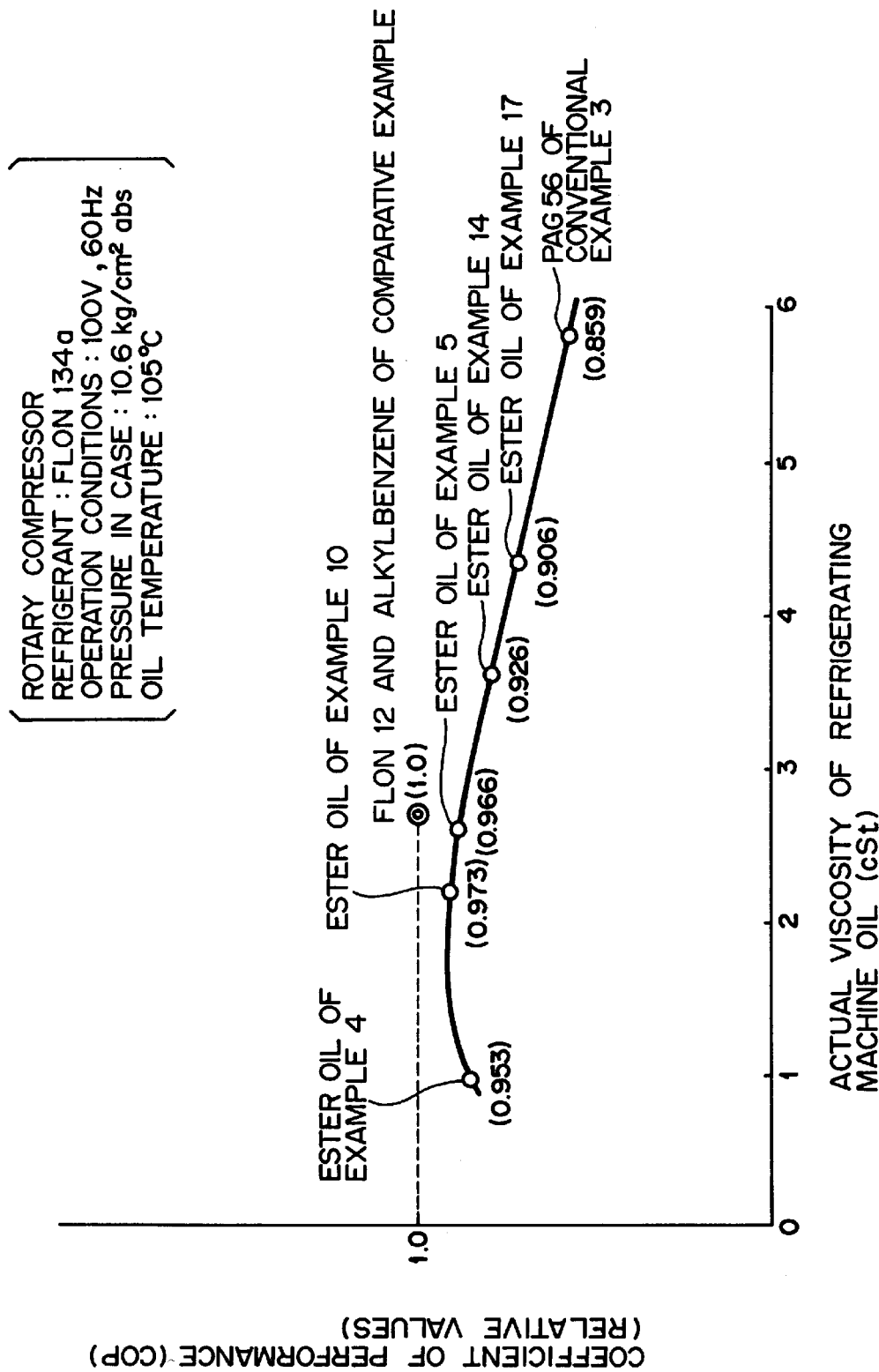
FIG. 3 is a graph showing a relationship between the atual viscosity of each refrigerating machine oil and the coefficient of performance during rated operation of a high-pressure vessel type rotary compressor.

FIG. 3 shows a relationship between the actual viscosity of each refrigerating machine oil and the coefficient of performance (COP) which was determined for the ester oils according to the present invention having a viscosity at 40° C. of 5 to 56 cSt and conventional examples, i.e., a polyalkylene glycol and an alkylbenzene oil (SUNISO Z-300A) used in combination with flon 12. In FIG. 3, the axis of abscissa refers to the actual viscosity of each refrigerating machine oil stored in the rotary compressor, and the axis of ordinate to the coefficient of performance (expressed in terms of a relative value) of the compressor.

According to FIG. 3, when refrigerating machine oils are compared in the coefficient of performance by taking the coefficient of performance attained by the conventional combination of flon 12 and Z-300A (an alkylbenzene oil) having a viscosity at 40° C. of 56 cSt, as 1.0, the coefficient of performance attained for the combination of the polyalkylene glycol (PAG56) of Conventional Example 3 and flon 134a is as small as 0.859, indicating that the energy efficiency is lowered by about 14%.

On the other hand, the complex ester according to the present invention with a viscosity at 40° C. of 56.6 cSt of Example 17 gave a satisfactory coefficient of performance of 0.906. It can be speculated that this result is attributable to a reducing effect on friction loss caused on the basis of the journal bearing theory represented by the theory of the formula (9), a reducing effect on oil-agitating power, a heat-dissipating effect, etc. which are brought about because the viscosity of the refrigerating machine oil which contains flon 134a dissolved therein becomes as low as 4.35 cSt under the same operation conditions.

When the ester oils according to the present invention which had a still lower viscosity of 5 to 32 cSt (at 40° C.) were compared in the coefficient of performance under the same conditions, the ester oil with a viscosity of 32.6 cSt (at 40° C.) of Example 14, the ester oil with a viscosity of 14.9 cSt (at 40° C.) of Example 5 and the ester oil with a viscosity of 14.9 cSt (at 40° C.) of Example 10 gave coefficient values of 0.926, 0.966 and 0.973, respectively. Thus, the coefficient of performance was increased in that order. On the other hand, in the case of the ester oil with a viscosity of 5.5 cSt (at 40° C.) of Example 4, the coefficient of performance was 0.953, namely, it showed a tendency to be decreased a little.

From these results, it can be seen that an ideal ester oil suitable for the rotary compressor is an ester oil which has a viscosity at 40° C. in the range of 5 to 32 cSt (exactly, 5.5 to 32.6 cSt), i.e., a range around the most suitable value of 14.9 cSt, and contains two or more ester linkages in the molecule, as described above.

Example 19

Flon 134a and each of the refrigerating machine oils according to the present invention exemplified in Table 1 were used in a low-pressure vessel type reciprocating compressor, and the compressor was incorporated into a refrigerator, i.e., a refrigerating apparatus. The refrigerator was then subjected to a high-temperature reliability test (pressure in case 1.6 kg/cm² abs, case temperature 85° C., 100 V, 50 Hz).

Figure 4:
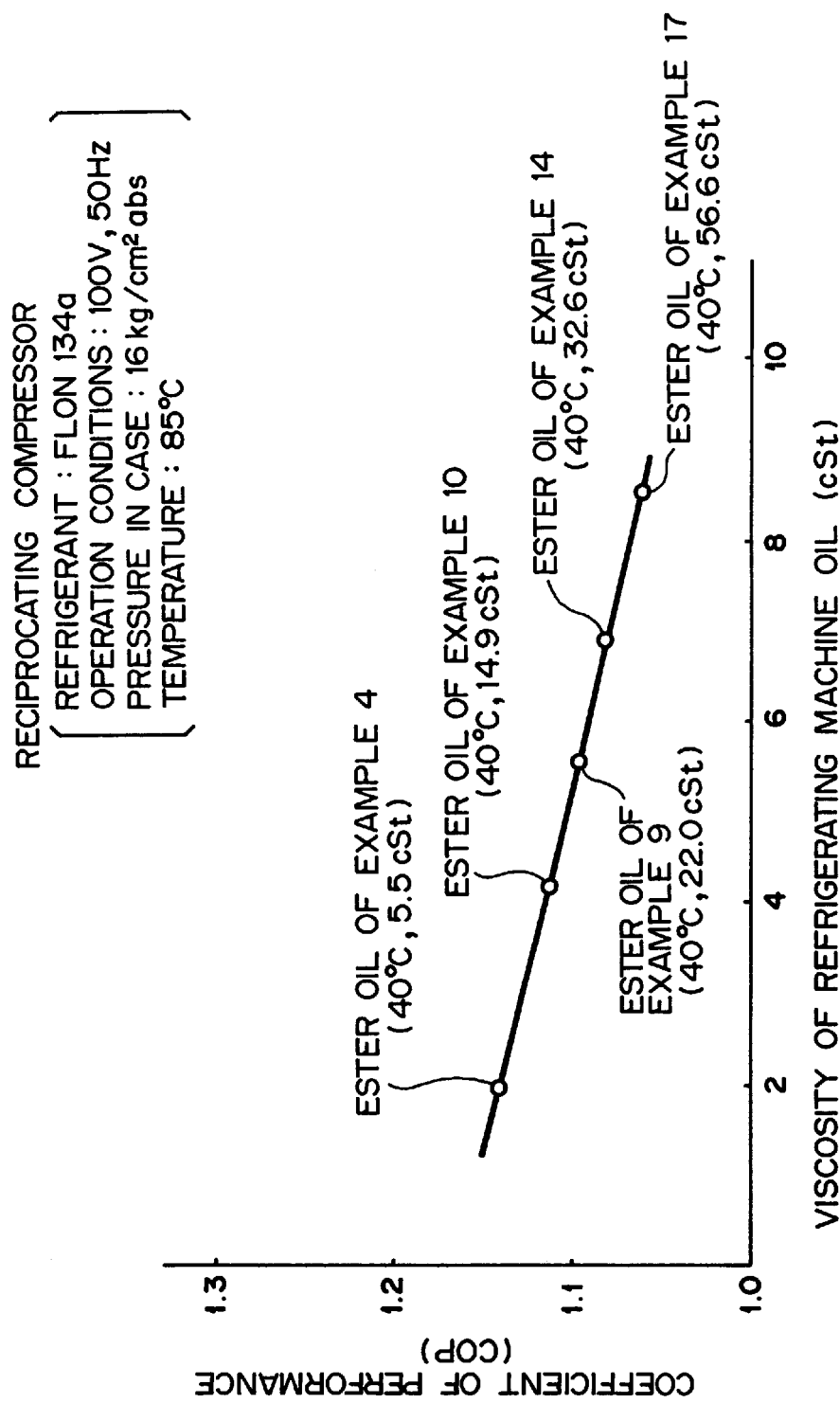
FIG. 4 is a graph showing a relationship between the actual viscosity and the coefficient of performance during rated operation of a low-pressure vessel type reciprocating compressor.

FIG. 4 shows the test results. In this graph, the axis of abscissa refers to the measured value of viscosity of the refrigerating machine oil, and the axis of ordinate to the coefficient of performance (COP). The graph was obtained by plotting the coefficient of performance against the actual viscosity in actual operation of each of the sample refrigerating machine oils with a viscosity at 40° C. of 5.5, 14.9, 22.0, 32.6 and 56.6 cSt, respectively, shown in Examples in Table 1. The coefficient of performance is in linear relation with the actual viscosity.

From the results shown in FIG. 4, it can be seen that the lower the viscosity of the refrigerating machine oil, the larger the coefficient of performance of the low-pressure vessel type reciprocating compressor. The refrigerating machine oils having an actual viscosity of 2 to 4.2 cSt and a viscosity at 40° C. of 5.5 to 14.9 cSt can be said to be excellent. When the actual viscosity is less than 2 cSt, a decrease of the coefficient of performance and a lowering of the reliability of bearings tend to be caused because in the case of using a conventional material such as cast iron or an iron-based sintered material for producing the sliding parts of the compressor, the precision of finishing the surfaces of the sliding parts is limited, and therefore at too low an actual viscosity, the lubrication on the surfaces gets into the so-called boundary lubrication region in which the contact between metal surfaces occurs.

Example 20

The lubrication in a refrigerating machine and a refrigerant compressor for achieving the third object of the present invention is explained below with reference to the following example.

Figure 5:
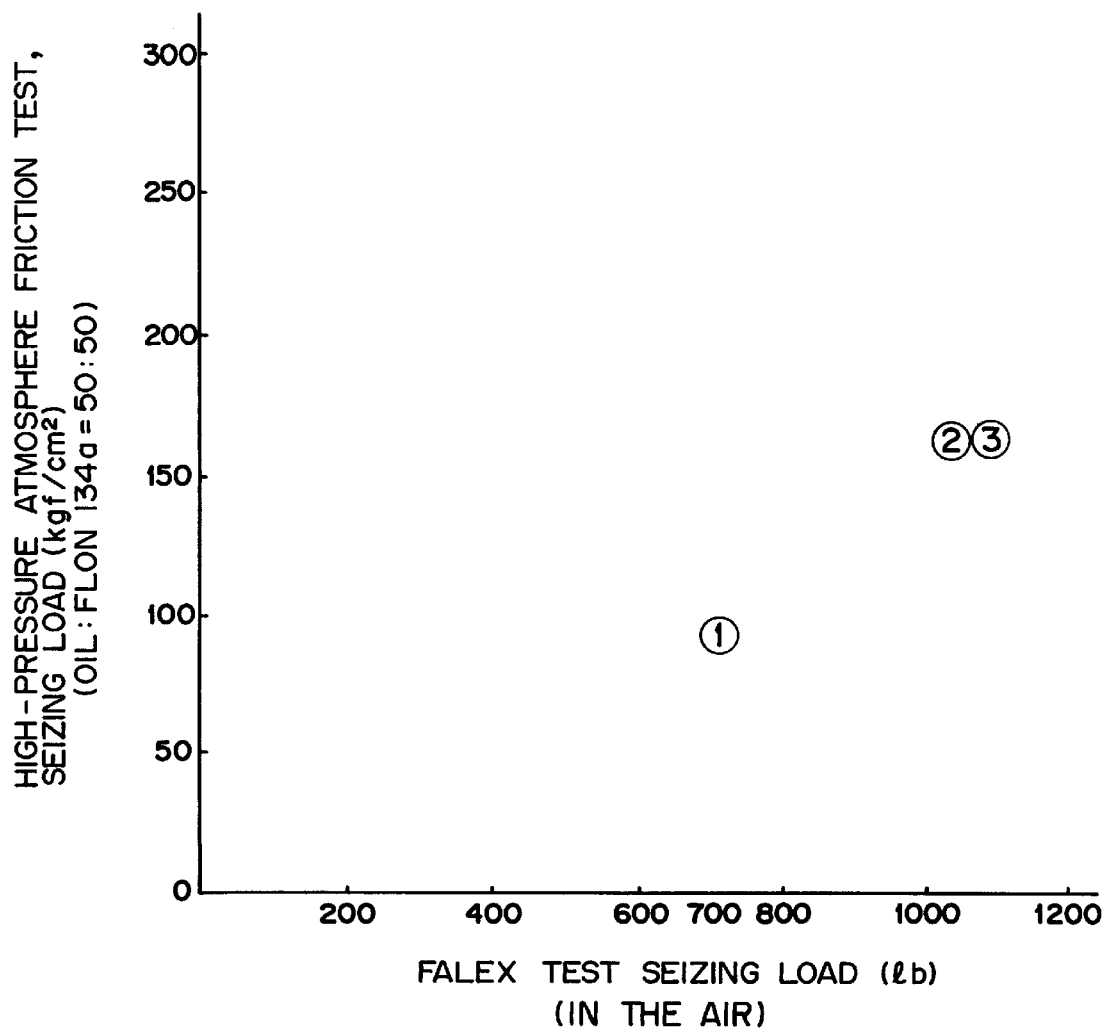
FIG. 5 is a graph showing a relationship between FALEX test using an iron-based frictional sliding surface and a high-pressure atmosphere friction test using an oil containing flon 134a dissolved therein.

For evaluating the lubrication, there were carried out a FALEX test in which a seizing load was measured in the air, and a high-pressure atmosphere friction test in which a seizing load was measured in a refrigerating machine oil containing 50% of flon 134a dissolved therein. FIG. 5 is a graph showing the correlation between the results of the two tests. The seizing load is as follows. An increasing load was applied to a rotating sample pin from both sides and a load at which seizing was caused was expressed in pound (lb).

In the present example, the ester oil of trimethylolpropane (TMP) and isoheptanoic acid (i-$C_7$) of Example 10 exemplified in Table 1 was employed as a typical example of a refrigerating machine oil used in the refrigerating apparatus of the present invention, and there was determined a relationship between the kind and amount of an extreme pressure agent added to the ester oil and the lubricating characteristics. As to materials for test pieces used for the evaluation of the lubrication, the materials for the pin and a block were standard materials, i.e., SNC-21 (nickel chrome steel) according to the standard of JIS and SUM 41 (resulfurized free-cutting steel) according to the standard of JIS, respectively. On the other hand, in the high-pressure atmosphere friction test, there was measured a load at which seizing was caused by friction between cylinders made of a material for shaft (eutectic graphite cast iron) and a material for roller (eutectic graphite cast iron tempered material), respectively, which had given satisfactory results in rotary compressors.

As shown in the case of sample No. 1 in FIG. 5, the ester oil (the oil of Example 10) containing no extreme pressure agent gave a FALEX seizing load of 700 lb and a seizing load of as low as 90 kgf/cm² in a flon 134a atmosphere. On the other hand, in the case of sample No. 2 and sample No. 3, the FALEX seizing load was further increased by 400 lb to reach 1100 lb and the seizing load in a flon 134a atmosphere was increased by 90 kg/cm² to reach 180 kg/cm², owing to addition of each of the following extreme pressure agents. In the case of sample No. 2, CHELEX H-10 (a trade name, mfd. by SAKAI CHEMICAL INDUSTRY Co., Ltd.) which was an acidic phosphoric acid containing an active OH group in the molecule, was added in an amount of 1%. In the case of sample No. 3, an ester compound of an alkylene glycol and phosphoric acid (butylpolyoxypropylene phosphate ester) was added in an amount of 1%.

That is, it was actually proved that the phosphorus-containing compounds such as the acidic phosphoric ester and the alkylene glycol phosphate ester compound act effectively as extreme pressure agents for preventing seizing, regardless of the presence of flon 134a.

Next, a FALEX test was carried out continuously for a maximum time of 120 minutes while keeping an applied load constant at 100 lb, and the abrasion loss of a pin, i.e., an iron-based test piece, was measured. The results obtained are shown in FIG. 6. In the case of the oil of sample No. 4 which contained no extreme pressure agent, the pin was worn in an amount of 25 mg. On the other hand, in the case of both of the oils containing each of the above-mentioned phosphorus-containing compounds, the abrasion loss was as small as 0.4 mg as shown for sample No. 7 and sample No. 8, namely, the abrasion loss could be reduced to one-fifth or less. The amount of the phosphorus-containing compound added is effective from about 0.05 wt % as shown for sample No. 5. The effect of the compound is increased with an increase of the amount. But when the amount exceeds 10 wt %, the improving effect on the lubrication hits the ceiling, so that the addition of the compound becomes economically disadvantageous and hence becomes unpractical.

The abrasion loss could be reduced by increasing the viscosity of oil from 14.9 cSt (at 40° C.) of sample No. 4 to 56.6 cSt (40° C.) of sample No. 6.

From the facts described above, it was found that the seizing load, abrasion resistance and lubrication of the iron-based sliding members could be greatly improved by adding a phosphorus-containing compound such as an acidic phosphoric ester, phosphoric ester, alkylene glycol phosphate ester or the like as an extreme pressure agent to the refrigerating machine oil used in the present invention, in an amount of 0.05 to 10 wt %, or by adjusting the viscosity of the oil to a high value instead of adding the extreme pressure agent. The refrigerating machine oil which contains the extreme pressure agent exhibits excellent performance characteristics particularly in the presence of a flon type refrigerant containing no chlorine, such as flon 134a.

Example 21

An example for achieving the fourth object of the present invention is described below. The behaviors of electrical insulating materials used in the hermetic motor of a compressor, in the presence of both flon 134a and the refrigerating machine oil according to the present invention were evaluated. The results obtained are explained below with reference to Table 2 and Table 3.

Flon 134a and refrigerating machine oils were evaluated by observing the degree of deterioration of characteristics of a magnet wire (an enameled wire) and an insulating film material by a sealed tube test, for preventing external influence.

(1) Insulating characteristics of a magnet wire (an enameled wire)

As magnet wire test pieces, two kinds of test pieces, i.e., 5% elongated products and twisted-pair test pieces were subjected to a sealed tube test at 150° C. for 40 days. An explanation is given below with reference to the results shown in Table 2.

As a result of the sealed tube test carried out for a combination of flon 134a and the polyalkylene glycol listed as Conventional Example 3 in Table 1 which is a refrigerating machine oil said to be suitable for flon 134a, 5% elongated products of both the polyester wire (PEW) of sample No. 9 and the ester imide wire (EIW-R) of sample No. 10 in Table 2 were crazed, and the retention of the dielectric breakdown voltage of twisted-pair test pieces of these two kinds of wires was greatly lowered to 30 to 32%.

On the other hand, the same evaluation as above was carried out for a combination of flon 134a and the composite ester oil composed of glutaric acid (Glut), neopentyl glycol (NPG) and isohexanoic acid (i-$C_6$) which is a refrigerating machine oil used in the present invention and is exemplified in Table 1. Consequently, the same polyester wire (whose glass transition temperature is shown in Table 2) and polyester imide wire as the wires which were described above and deteriorated as conventional examples sample No. 9 and sample No 10, showed no abnormality in appearance, as shown for sample No. 11 and sample No. 12. The retention of the dielectric breakdown voltage of these samples was as high as 95% or more, indicating that the degree of deterioration of the magnet wires was very low. The reason is as follows. The refrigerating machine oil according to the present invention has a low water content in the early stages and a high thermal stability, and hardly produce an acidic substance capable of accelerating hydrolysis, and these characteristics bring about the improving effects.

Sample No. 13 was obtained by coating the ester imide wire of sample No. 12 with a polyimide layer to form a composite. Sample No. 14 was a wire coated with a polyamide-imide alone (AIW). Both samples had satisfactory characteristics. It was found that such a magnet wire obtained by thus coating a layer with a high glass transition temperature on a layer with a low glass transition temperature contributes to the improvement of the reliability of a compressor because the upper coating layer is effective as protective layer against an attack of flon 134a and the refrigerating machine oil.

(2) Insulating characteristics of insulating films

As a sealed tube test on insulating films for motor, an insulating strength test at 130° C. for 40 days was carried out, whereby the films were evaluated with respect to the appearance and the retention of tensile strength. The results obtained are shown in Table 3.

When a polyester film (Lumilar $X_{10}$, a trade name, mfd. by Toray Industries, Inc.) conventionally used in the hermetic motor of a compressor was used in the conventional polyalkylene glycol oil shown for sample No. 15, its oligomer component was precipitated in the oil and the retention of tensile strength was 83%.

On the other hand, in a combination of the complex ester oil of Example 17 according to the present invention and flon 134a, no oligomer was precipitated and the retention of tensile strength was as high as 89% or more in the case of all of Lumilar $X_{10}$ of sample No. 16, PA-61M (a trade name, mfd. by Hitachi Kasei Co., Ltd.), i.e., the polyamide-imide-coated polyester of sample No. 17, the polyphenylene sulfide (PPS) film of sample No. 18, and the polyether ether ketone (PEEK) film of sample No. 19. Thus, it was found that the electrical insulating system of a compressor using flon 134a can be markedly improved in reliability.

That is, it was found that the insulation system of a hermetic motor can be completed by properly selecting a film from the group consisting of polyester films, polyamide-imide-coated polyester films, PPS films and PEEK films which have a glass transition temperature of 65° C. or higher, and using the same in the presence of both flon 134a and the refrigerating machine oil containing two or more ester groups in the molecule according to the present invention. It was found that when the insulation system is thus completed, there can be solved the problem of precipitation of an oligomer component (the problem described above for the oil of Conventional Example 3 shown for sample No. 15), the problems in the performance characteristics of a compressor and a refrigerating apparatus which are caused by the lowering of the film strength, and the practical problems in the long-term reliability.

TABLE 2

| Sample No. | Insulation-coated winding wire | Glass transition temperature (° C.) | Oil tested | Results of evaluating performance characteristics with respect to resistance to an oil and flon 134a | |
|---|---|---|---|---|---|
| | | | | Appearance change (Note 1) | Retention of dielectric breakdown voltage (Note 2) |
| 9 | PEW (Polyester) | 120–140 | Conventional Example 3 | Crazed | 30 |
| 10 | EIW-R (Polyester imide) | 190–210 | Conventional Example 3 | " | 32 |
| 11 | PEW (Polyester) | 120–140 | Example 17 | No abnormality | 95 |
| 12 | EIW-R | 190–210 | " | No abnormality | 98 |
| 13 | RFW-V (Upper layer polyamide/lower layer polyester imide) | Lower layer 190–210 Upper layer 250–310 | " | No abnormality | 98 |
| 14 | AIW (Polyamide imide) | 250–310 | " | No abnormality | 98 |

Sealed tube test: 150° C. × 40 days
*Note 1: 5% elongated wire
Note 2: A relative value obtained for a twisted pair test piece by dividing a value after the test by a value before the test (taken as 100).

TABLE 3

| Sample No. | Insulating film | Glass transition temperature (° C.) | Oil tested | Results of evaluating performance characteristics with respect to resistance to an oil and flon 134a | |
|---|---|---|---|---|---|
| | | | | Appearance change | Retention of tensile strength (Note 1) |
| 15 | Lumilar × 10 (polyester) | 65 | Conventional Example 3 | Oligomer was precipitated | 89 |
| 16 | Lumilar × 10 | 65 | Example 17 | None | 89 |
| 17 | PA-61M (Polyamide-imide-coated polyester) | 65 | " | None | 90 |
| 18 | PPS (Polyphenylene sulfide) | 85 | " | None | 95 |
| 19 | PEEK (Polyether ether ketone) | 143 | " | None | 98 |

Sealed tube test: 130° C. × 40 days
Note 1: A relative value obtained by dividing a value after the test by a value before the test (taken as 100).

Example 22

An example for achieving the fifth object of the present invention is described below.

It is known that particularly in refrigerating apparatus using a heat exchanger at 0° C. or lower, the control of water content in the refrigerating apparatus has an important influence on the cooling capability and the assurance of the quality of an electrical insulating material. Therefore, the establishment of a technique for removing water is indispensable for the system of the refrigerating apparatus.

In a refrigeration cycle composed as shown in FIG. 9, flon 134a gas discharged from a compressor 40 is condensed into a liquid refrigerant by heat dispersion in a condenser 41. This high-temperature, high-pressure liquid refrigerant is transformed into low-temperature, low-pressure wet vapor by an expansion mechanism 42 and sent to an evaporator 43. In this series of steps, the water in the refrigerating apparatus is adsorbed and removed by a drying agent represented by synthetic zeolite in a dryer 45 provided between the condenser 41 and the expansion mechanism 42. It is important to choose the kind of the drying agent in consideration of a use environment in which the refrigerating machine oil according to the present invention and flon 134a coexist. The suitability of the drying agent is explained below with reference to Examples shown in Table 4.

Drying agents tested are synthetic zeolites having trade names of Molecular Sieves all manufactured by UNION SHOWA K.K. These synthetic zeolites are classified according to the adsorption capacity (%) at 25° C. and at a carbon dioxide gas partial pressure of 250 mmHg which is used as an indication of the distribution of the diameter of pores for adsorption.

As to the suitability of the synthetic zeolites for flon 134a and the refrigerating machine oil according to the present invention, the results of a sealed tube test shown in Table 4 are explained below.

It was found that the synthetic zeollite composed mainly of sodium aluminate and sodium silicate shown as sample No. 20 (a conventional example; trade name 4ANRG) has a fluorine ion adsorption of as large as 1.05%, so that problems due to the lowering of the strength or formation into powder are caused by the reaction of the synthetic zeolite. Sample No. 21 (a comparative example; trade name 4AXH-6) and sample No. 22 (a comparative example; trade name XH-7) which are composed mainly of sodium aluminate, potassium aluminate, sodium silicate and potassium silicate have a carbon dioxide gas adsorption capacity of 4.5 to 1.5% and a reduced fuorine ion adsorption of 0.24%. But, they cannot put into practical use because their fluorine ion adsorption is still too large.

Sample No. 23 (an example; trade name XH-600) and sample No. 24 (an example; trade name XH-9) which consist of a synthetic zeolite composed mainly of potassium aluminate, sodium aluminate, potassium silicate and sodium silicate have a carbon dioxide gas adsorption capacity of 0.2% and a greatly reduced fluorine adsorption of 0.04%. Since a fluorine ion adsorption which permits practical use is 0.1% or less, the value of 0.2% indicates that these samples are sufficiently usable.

The deterioration of characteristics of a synthetic zeolite itself by the adsorption of molecules of flon 134a is dependent on the distribution of pore diameter of the synthetic zeolite. It has been confirmed that for adjusting the fluorine ion adsorption to 0.1% or less, the employment of a synthetic zeolite whose carbon dioxide gas adsorption capacity has been adjusted to 1.0% or less is sufficient. That is, the following was found. When a synthetic zeolite composed of alkali metal silicates and alkali metal aluminates whose carbon dioxide gas adsorption at 25° C. and at a carbon dioxide gas partial pressure of 250 mmHg has been adjusted to 1.0% or less, for example, Molecular Sieves XH-600 or XH-9 (trade names, mfd. by UNION SHOWA K.K.), is used as a drying agent in a refrigerating apparatus using flon 134a and the refrigerating machine oil containing two or more ester linkages in the molecule according to the present invention, which are placed together, only water can be effectively removed and fluorine ion adsorption hardly produce influences such as formation into powder or a lowering of the strength of beads, and therefore such a drying agent is very excellent for practical purposes.

TABLE 4

| Sample No. | Drying agent Name of sample | $CO_2$ adsorption capacity (%) $CO_2$ partial pressure 250 mmHg (25° C.) | Sealed tube test* Decomposition rate of refrigerant (%) | Fluorine ion adsorption (%) |
| --- | --- | --- | --- | --- |
| 20 | 4ANRG | 12.0 | 0.028 | 1.05 |
| 21 | 4AXH-6 | 4.5 | 0.032 | 0.24 |
| 22 | XH-7 | 1.5 | 0.035 | 0.24 |
| 23 | XH-600 | 0.2 | 0.042 | 0.04 |
| 24 | XH-9 | 0.2 | 0.04 | 0.04 |

*Sealed tube test: 150° C., 7 days

The carbon dioxide gas adsorption capacity at 25° C. and at a carbon dioxide gas partial pressure of 250 mmHg should be 1.0% or less, and it is preferably as small as possible. When it is zero %, the drying agent absorbs water alone selectively but not fluorine ions, so that the drying agent becomes ideal molecular sieves. The present invention is constituted as explained above and hence has the following effects.

(1) By using the refrigerating machine oil described below, in a refrigerating apparatus comprising a compressor, condenser, dryer, expansion mechanism and evaporator and using a flon type refrigerant containing no chlorine and having a critical temperature of 40° C. or higher which is represented by flon 134a, the performance characteristics and reliability of the compressor and the refrigerating apparatus can be markedly improved because the refrigerating machine oil and the refrigerant are highly miscible with each other without their separation into two layers in the whole temperature range where the compressor and the refrigerating apparatus are used, and hence a lubricating oil film on the shaft and bearings of the compressor and the refrigerant-heat-transferring capability of a heat exchanger are assured. The refrigerating machine oil comprises as base oil an ester oil according to the present invention which contains two or more ester linkages in the molecule and has a refrigerating machine oil viscosity at 40° C. of 2 to 70 cSt, preferably 5 to 32 cSt and a refrigerating machine oil viscosity at 100° C. of 1 to 9 cSt, preferably 2 to 6 cSt. The refrigerating machine oil has a lower critical solution temperature of 0° C. or lower or −30° C. or lower, and is used in the first target, i.e., a moderate-temperature refrigerating apparatus such as a dehumidifier, or the second targer, i.e., a low-temperature refrigerating apparatus such as a refrigerator, respectively.

(2) Moreover, the performance characteristics and the reliability can be improved by an improving effect on the lubrication in the sliding portions of bearings of the refrigerant compressor which is obtained by adding a phosphoric ester type extreme pressure agent having OH groups in the molecule and other additives such as an abrasion-preventing agent, acid-capturing agent, antioxidant, defoaming agent, etc. to the above-mentioned refrigerating machine oil.

(3) By simultaneous use of the refrigerating machine oil containing two or more ester linkages in the molecule according to the present invention described below and flon 134a, the so-called performance characteristics can be improved, namely, the coefficient of performance indicating the performance characteristics of the compressor can be increased, the power consumption of the refrigerating apparatus using the compressor can be reduced, and the refrigerating capacity can be increased. In a high-pressure vessel type rotary compressor, the refrigerating machine oil is one which has a viscosity at 40° C. of 2 to 70 cSt, preferably 5 to 32. In a low-pressure vessel type reciprocating compressor, the refrigerating machine oil is one which has a viscosity at 40° C. of 2 to 70 cSt, preferably 5 to 15 cSt.

(4) The electrical insulating performance and long-term reliability of the refrigerating apparatus can be markedly improved by using an insulation-coated winding wire with a glass transition temperature of 120° C. or higher and an insulating film with a glass transition temperature of 70° C. or higher as insulating materials for a motor, and a refrigerating machine oil comprising as base oil the ester oil according to the present invention, in a refrigerant compressor using a flon type refrigerant containing no chlorine represented by flon 134a.

(5) By using a synthetic zeolite composed of alkali metal silicates and alkali metal aluminates having a carbon dioxide gas adsorption capacity at 25° C. and at a carbon dioxide gas partial pressure of 250 mmHg of 1.0% or less, in the dryer constituting the refrigerating apparatus, water in the refrigeration cycle can be efficiently separated and adsorbed, and there can be prevented troubles caused by formation of the drying agent into powder by deterioration of the drying agent itself, namely, the problems caused by clogging of a piping for refrigerant with the drying agent and abnormal abrasion due to intrusion of the drying agent into the sliding portions of the compressor. Therefore, the employment of the synthetic zeolite has a marked improving effect on the performance characteristics and the long-term reliability.

(6) The refrigerating apparatus having the constitution explained above can reduce the ozone depletion potential (ODP) and the global warming potential (GWP) which are in question in the terrestrial environment to zero and 0.3 or less, respectively, relative to values attained when a conventional chlorine-containing flon type refrigerant gas (e.g. flon 12) is used.

What is claimed is:

1. A refrigerant compressor used in a refrigeration cycle wherein the refrigerant compressor comprises a high-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and in which a high-pressure refrigerant gas discharged from the compressor section resides, said refrigerant comprising a chlorine-free fluorocarbon and/or hydrofluorocarbon and having a critical temperature of 40° C. or higher, and said refrigerating machine oil consisting essentially of an ester oil obtained from a single alcohol and an acid component comprising one or more fatty acids having six to thirteen carbon atoms, wherein said ester oil has a viscosity at 40° C. of 2 to 70 cSt and a viscosity at 100° C. of 1 to 9 cSt, wherein said ester oil comprises at least one member selected from the group consisting of the ester oils represented by the following general formulae (1) to (5):

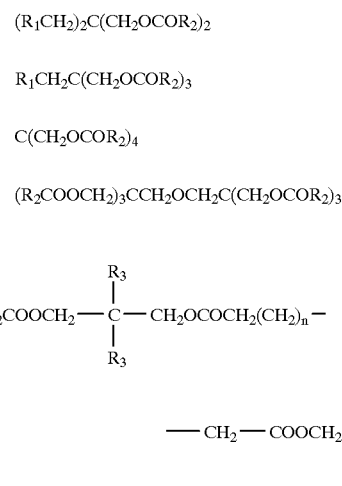

wherein $R_1$ is an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said winding wire of said stator comprises a core wire having an enamel coating having a glass transition temperature of 120° C. or higher.

2. A refrigerant compressor according to claim 1, wherein said enamel coating comprises at least one insulating layer selected from the group consisting of layers of polyester imides, polyamides and polyamide-imides.

3. A refrigerant compressor according to claim 1, wherein the insulating film comprises a crystalline plastics film having a glass transition temperature of 50° C. or higher.

4. A refrigerant compressor according to claim 1, wherein said insulating film comprises at least film made of a material selected from the group consisting of polyethylene terephthalates, polybutylene terephthalates, polyphenylene sulfides, polyether ether ketones, polyethylene naphthalates, polyamide-imides, and polyimides.

5. A refrigerant compressor according to claim 1, wherein said ester oil comprises at least one member selected from the group consisting of the ester oils represented by the general formulae (1) to (4).

6. A refrigerant compressor used in a refrigeration cycle wherein the refrigerant compressor comprises a low-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and from which a high-pressure refrigerant gas discharged from the compressor section is directly exhausted, said refrigerant comprising a chlorine-free fluorocarbon and/or hydrofluorocarbon and having a critical temperature of 40° C. or higher, and said refrigerating machine oil consisting essentially of an ester oil obtained from a single alcohol and an acid component comprising one or more fatty acids having six to thirteen carbon atoms, wherein said ester oil has a viscosity at 40° C. of 2 to 70 cSt and a viscosity at 100° C. of 1 to 9 cSt, wherein said ester oil comprises at least one member selected from the group consisting of the ester oils represented by the following general formulae (1) to (5):

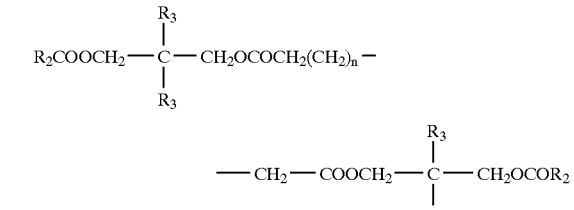

wherein $R_1$ is H or an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said winding wire of said stator comprises a core wire having an enamel coating having a glass transition temperature of 120° C. or higher.

7. A refrigerant compressor according to claim 1 or 6, wherein said chlorine-free hydrocarbon and/or hydrofluorocarbon is flon 134a.

8. A refrigerant compressor according to claim 1 or 6, wherein said refrigerant further comprises an extreme pressure agent.

9. A refrigerant compressor according to claim 8, wherein the extreme pressure agent is at least one member selected from the group consisting of alkylpolyoxyalkylene phosphate esters represented by the following formulas (6) and (7):

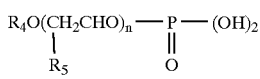

(6)

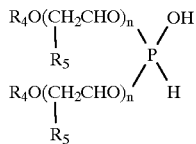

(7)

wherein $R_4$ is an alkyl group having 1 to 8 carbon atoms, and $R_5$ is H or an alkyl group having 1 to 3 carbon atoms, and n is a value so as to make the molecular weight 400 to 700, and is contained in said refrigerant in an amount of 0.05 to 10 wt %.

10. A refrigerant compressor according to claim 8, wherein the extreme pressure agent is a dialkyl phosphate ester represented by the formula:

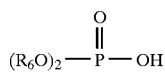

(8)

wherein $R_6$ is an alkyl group having 8 to 16 carbon atoms, and is contained in said refrigerant in an amount of 0.05 to 10 wt %.

11. A refrigerant compressor according to claim 8, wherein said refrigerant further comprises at least one member selected from the group consisting of acid-capturing agents, antioxidents and defoaming agents.

12. A refrigerant compressor according to claim 6, wherein said ester oil comprises at least one member selected from the group consisting of the ester oils represented by the general formulae (1) to (4).

13. A refrigerant compressor used in a refrigeration cycle wherein the refrigerant compressor comprises a high-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and in which a high-pressure refrigerant gas discharged from the compressor section resides, said refrigerant comprising a chlorine-free fluorocarbon and/or hydrofluorocarbon and having a critical temperature of 40° C. of higher, and said refrigerating machine oil consisting essentially of an ester oil obtained from a single alcohol and single acid, the single acid being a fatty acid having six to eleven carbon atoms, said refrigerating machine oil having a viscosity at 40° C. of 2 to 70 cSt and a viscosity at 100° C. of 1 to 9 cSt, and said winding wire of said stator comprises a core wire having an enamel coating having a glass transition temperature of 120° C. or higher.

14. A refrigerant compressor according to claim 13, wherein said single acid is a monobasic acid.

15. A refrigerant compressor used in a refrigeration cycle wherein the refrigerant compressor comprises a low-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and from which a high-pressure refrigerant gas discharged from the compressor section is directly exhausted, said refrigerant comprising a chlorine-free fluorocarbon and/or hydrofluorocarbon and having a critical temperature of 40° C. or higher, and said refrigerating machine oil consisting essentially of an ester oil obtained from a single alcohol and a single acid, the single acid being a acid having six to eleven carbon atoms, the refrigerating machine oil having a viscosity of 40° C. of 2 to 70 cSt and a viscosity at 100° C. of 1 to 9 cSt, and said winding wire of said stator comprises a core wire having an enamel coating having a glass transition temperature of 120° C. or higher.

16. A refrigerant compressor according to claim 15, wherein said single acid is a monobasic acid.

17. A refrigerant compressor used in a refrigeration cycle wherein the refrigerant compressor comprises a high-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and in which a high-pressure refrigerant gas discharged from the compressor section resides, said refrigerant being composed mainly of a fluorocarbon refrigerant containing no chlorine and having a critical temperature of 40° C. or higher, and said refrigerating machine oil comprising as base oil an ester oil of one or more fatty acids, wherein the ester oil has a viscosity at 40° C. of 2 to 70 cSt and a viscosity at 100° C. of 1 to 9 cSt, wherein said ester oil comprises at least one member selected from the group consisting of the ester oils which are represented by the following general formulae (1) to (5):

(1)

(2)

(3)

(4)

(5)

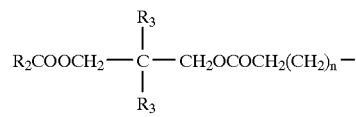

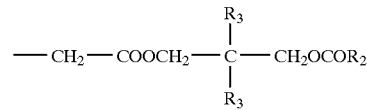

wherein $R_1$ is H or an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said winding wire of the stator comprises a core wire having an enamel coating having a glass transition temperature of 120° C. or higher.

18. A refrigerant compressor according to claim 17, wherein said enamel coating comprises at least one insulating layer selected from the group consisting of layers of polyester imides, polyamides and polyamide-imides.

19. A refrigerant compressor according to claim 17, wherein said ester oil comprises at least one member selected from the group consisting of the ester oils represented by the general formulae (1) to (4).

20. A refrigerant compressor used in a refrigeration cycle wherein the refrigerant compressor comprises a low-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and from which a high-pressure refrigerant gas discharged from the compressor section is directly exhausted, said refrigerant being composed mainly of fluorocarbon refrigerant containing no chlorine and having a critical temperature of 40° C. or higher, and said refrigerating machine oil comprising as base oil an ester oil of one or more fatty acids wherein the ester oil has a viscosity at 40° C. of 2 to 70 cSt and a viscosity at 100° C. of 1 to 9 cSt, wherein said ester oil comprises at least one member selected from the group consisting of the ester oils which are represented by the following general formulae (1) to (5):

$$(R_1CH_2)_2C(CH_2OCOR_2)_2 \tag{1}$$

$$R_1CH_2C(CH_2OCOR_2)_3 \tag{2}$$

$$C(CH_2OCOR_2)_4 \tag{3}$$

$$(R_2COOCH_2)_3CCH_2OCH_2C(CH_2OCOR_2)_3 \tag{4}$$

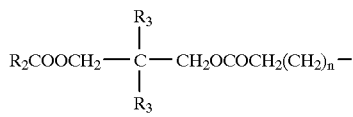
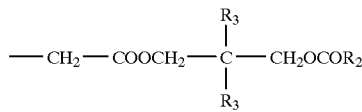
(5)

wherein $R_1$ is H or an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said winding wire of the stator comprises a core wire having an enamel coating having a glass transition temperature of 120° C. or higher.

21. A refrigerant compressor according to claim 20, wherein said enamel coating comprises at least one insulating layer selected from the group consisting of layers of polyester imides, polyamides and polyamide-imides.

22. A refrigerant compressor according to claim 20, wherein said ester oil comprises at least one member selected from the group consisting of the ester oils represented by the general formulae (1) to (4).

23. A refrigerant compressor used in a refrigeration cycle wherein the refrigerant compressor comprises a high-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and in which a high-pressure refrigerant gas discharged from the compressor section resides, said refrigerant being composed mainly of a fluorocarbon refrigerant containing no chlorine and having a critical temperature of 40° C. or higher, and said refrigerating machine oil comprising as base oil an ester oil of one or more fatty acids wherein the ester oil has a viscosity at 40° C. of 2 to 70 cSt and a viscosity at 100° C. of 1 to 9 cSt, wherein said ester oil comprises at least one member selected from the group consisting of the ester oils which are represented by the following general formulae (1) to (5):

$$(R_1CH_2)_2C(CH_2OCOR_2)_2 \tag{1}$$

$$R_1CH_2C(CH_2OCOR_2)_3 \tag{2}$$

$$C(CH_2OCOR_2)_4 \tag{3}$$

$$(R_2COOCH_2)_3CCH_2OCH_2C(CH_2OCOR_2)_3 \tag{4}$$

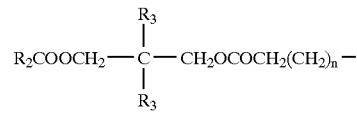
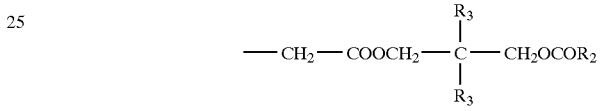
(5)

wherein $R_1$ is H or an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said insulating film comprises a crystalline plastics film having a glass transition temperature of 50° C. or higher, and said winding wire of said stator comprises a core wire having an enamel coating having a glass transition temperature of 120° C. or higher.

24. A refrigerant compressor according to claim 23, wherein said insulating film comprises at least film made of a material selected from the group consisting of polyethylene terephthalates, polybutylene terephthalates, polyphenylene sulfides, polyether ether ketones, polyethylene naphthalates, polyamide-imides, and polyimides.

25. A refrigerant compressor according to claim 23, wherein said ester oil comprises at least one member selected from the group consisting of the ester oils represented by the general formulae (1) to (4).

26. A refrigerant compressor used in a refrigeration cycle wherein the refrigerant compressor comprises a low-pressure closed vessel stored with a refrigerating machine oil which accommodates a motor composed of a rotor and a stator having a winding wire and an insulating film, a rotating shaft fitted in the rotor, and a compressor section connected to the motor through the rotating shaft, and from which a high-pressure refrigerant gas discharged from the compressor section is directly exhausted, said refrigerant being composed mainly of fluorocarbon refrigerant containing no chlorine and having a critical temperature of 40° C. or higher, and said refrigerating machine oil comprising as base oil an ester oil of one or more fatty acids wherein the ester oil has a viscosity at 40° C. of 2 to 70 cSt and a viscosity at 100° C. of 1 to 9 cSt, wherein said ester oil comprises at least one member selected from the group consisting of the ester oils which are represented by the following general formulae (1) to (5):

$(R_1CH_2)_2C(CH_2OCOR_2)_2$      (1)

$R_1CH_2C(CH_2OCOR_2)_3$      (2)

$C(CH_2OCOR_2)_4$      (3)

$(R_2COOCH_2)_3CCH_2OCH_2C(CH_2OCOR_2)_3$      (4)

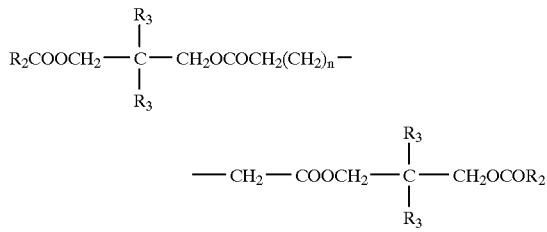

(5)

wherein $R_1$ is H or an alkyl group having 1 to 3 carbon atoms, $R_2$ is a straight or branched chain alkyl group having 5 to 12 carbon atoms, provided that in the formula (5) $R_2$ is a straight or branched chain alkyl group having 9 to 12 carbon atoms, $R_3$ is an alkyl group having 1 to 3 carbon atoms, and n is an integer of 0 to 5, and said insulating film comprises a crystalline plastics film having a glass transition temperature of 50° C. or higher, and said winding wire of said stator comprises a core wire having an enamel coating having a glass transition temperature of 120° C or higher.

27. A refrigerant compressor according to claim 26, wherein said insulating film comprises at least film made of a material selected from the group consisting of polyethylene terephthalates, polyethylene terephthalates, polyphenylene sulfides, polyether ether ketones, polyethylene naphthalates, polyamide-imides, and polyimides.

28. A refrigerant compressor used in a refrigeration cycle wherein the refrigerant compressor comprises a high-pressure closed vessel stored with a refrigerating machine oil which accommodates a motor composed of a rotor and a stator, a rotating shaft fitted in the rotor, and a compressor section connected to the motor through the rotating shaft, and in which a high-pressure refrigerant gas discharged from the compressor section resides, said refrigerant being composed mainly of a fluorocarbon refrigerant containing no chlorine and having a critical temperature of 40° C. or higher, and said refrigerating machine oil comprising as base oil an ester oil of one or more fatty acids having six to thirteen carbon atoms which ester oil contains at least two ester linkages $$\left(-O-\underset{\underset{O}{\|}}{C}-\right)$$

in the molecule and has a viscosity at 40° C. of 2 to 70 cSt and a viscosity at 100° C. of 1 to 9 cSt, said closed-vessel accommodating a motor composed of a rotor an a stator, a rotating shaft, and a compressor section connected to the motor through the rotating shaft, wherein a winding wire of the stator comprises a core wire having an enamel coating having a glass transition temperature of 120° C. or higher.

29. A refrigerant compressor used in a refrigeration cycle wherein the refrigerant compressor comprises a high-pressure closed-vessel stored with a refrigerating machine oil which accommodates a motor composed of a rotor and a stator, a rotating shaft fitted in the rotor, and a compressor section connected to the motor through the rotating shaft, and in which a high-pressure refrigerant gas discharged from the compressor section resides, said refrigerant being composed mainly of a fluorocarbon refrigerant containing no chlorine and having a critical temperature of 40° C. or higher, and said refrigerating machine oil comprising as base oil an ester oil of one or more fatty acids having six to thirteen carbon atoms which ester oil contains at least two ester linkages $$\left(-O-\underset{\underset{O}{\|}}{C}-\right)$$

in the molecule and has a viscosity at 40° C. of 2 to 70 cSt and a viscosity at 100° C. of 1 to 9 cSt, wherein an insulating film of the motor comprises a crystalline plastics film having a glass transition temperature of 50° C. or higher, and said winding wire of said stator comprises a core wire having an enamel coating having a glass transition temperature of 120° C. or higher.

30. A refrigerant compressor used in a refrigeration cycle wherein the refrigerant compressor comprises a low-pressure closed-vessel stored with a refrigerating machine oil which accommodates a motor composed of a rotor and a stator, a rotating shaft fitted in the rotor, and a compressor section connected to the motor through the rotating shaft, and from which a high-pressure refrigerant gas discharged from the compressor section is directly exhausted, said refrigerant being composed mainly of a fluorocarbon refrigerant containing no chlorine and having a critical temperature of 40° C. or higher, and said refrigerating machine oil comprising as base oil an ester oil of one or more fatty acids having six to thirteen carbon atoms which ester oil contains at least two ester linkages $$\left(-O-\underset{\underset{O}{\|}}{C}-\right)$$

in the molecule and has a viscosity at 40° C. of 2 to 70 cSt and a viscosity at 100° C. of 1 to 9 cSt, said closed-vessel accommodating a motor composed of a rotor an a stator, a rotating shaft, and a compressor section connected to the motor through the rotating shaft, wherein a winding wire of the stator comprises a core wire having an enamel coating having a glass transition temperature of 120° C. or higher.

31. A refrigerant compressor used in a refrigeration cycle wherein the refrigerant compressor comprises a low-pressure closed-vessel stored with a refrigerating machine oil which accommodates a motor composed of a rotor and a stator, a rotating shaft fitted in the rotor, and a compressor section connected to the motor through the rotating shaft, and from which a high-pressure refrigerant gas discharged from the compressor section is directly exhausted, said refrigerant being composed mainly of a fluorocarbon refrigerant containing no chlorine and having a critical temperature of 40° C. or higher, and said refrigerating machine oil comprising as base oil an ester oil of one or more fatty acids having six to thirteen carbon atoms which ester oil contains at least two ester linkages

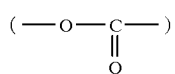
in the molecule and has a viscosity at 40° C. of 2 to 70 cSt and a viscosity at 100° C. of 1 to 9 cSt, wherein an insulating film of the motor comprises a crystalline plastics film having a glass transition temperature of 50° C. or higher, and said winding wire of said stator comprises a core wire having an enamel coating having a glass transition temperature of 120° C. or higher.
* * * * *